United States Patent
Kajitani et al.

(10) Patent No.: US 9,671,604 B2
(45) Date of Patent: Jun. 6, 2017

(54) OBSERVATION UNIT AND MICROSCOPE SYSTEM EQUIPPED WITH OBSERVATION UNIT

(71) Applicant: OLYMPUS CORPORATION, Tokyo (JP)

(72) Inventors: Kazuo Kajitani, Tokyo (JP); Hisashi Goto, Tokyo (JP); Yoshimasa Suzuki, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 224 days.

(21) Appl. No.: 14/542,034

(22) Filed: Nov. 14, 2014

(65) Prior Publication Data

US 2015/0070484 A1 Mar. 12, 2015

Related U.S. Application Data

(63) Continuation of application No. PCT/JP2013/062564, filed on Apr. 30, 2013.

(30) Foreign Application Priority Data

May 16, 2012 (JP) .................................. 2012-112810

(51) Int. Cl.
G02B 21/36 (2006.01)
G02B 21/00 (2006.01)
(Continued)

(52) U.S. Cl.
CPC ....... *G02B 21/368* (2013.01); *G02B 21/0004* (2013.01); *G02B 21/24* (2013.01);
(Continued)

(58) Field of Classification Search
CPC .... G02B 21/0004; G02B 21/24; G02B 21/36; G02B 21/361; G02B 21/365; G02B 21/368; G02B 25/001
(Continued)

(56) References Cited

U.S. PATENT DOCUMENTS 5,764,408 A 6/1998 Otaki
6,525,878 B1 * 2/2003 Takahashi .......... G02B 21/0012
359/376
(Continued)

FOREIGN PATENT DOCUMENTS

JP 08-278448 10/1996
JP 10-213752 8/1998
(Continued)

OTHER PUBLICATIONS

International Search Report, dated Jul. 2, 2013, issued in corresponding International Application No. PCT/JP2013/062564.
(Continued)

*Primary Examiner* — Shan Elahi
(74) *Attorney, Agent, or Firm* — Andrews Kurth Kenyon LLP

(57) ABSTRACT

A microscope system (100) includes a microscope (10) and an observation unit (20) provided separately from the microscope. The microscope includes a microscope objective lens (3), an image pickup element (31) disposed at a position at which an image is formed through the microscope objective lens, and a first control apparatus (32) connected with the image pickup element. The observation unit includes a second control apparatus (21), a display device (22, 22a, 22b) connected with the second control apparatus, and a magnifier optical system (25a, 25b) arranged at a predetermined distance from the display device. The microscope system further includes a communication apparatus (21) for
(Continued)

communication between the first control apparatus and the second control apparatus so that an image picked up by the image pickup apparatus is displayed on the display device.

19 Claims, 16 Drawing Sheets

(51) Int. Cl.
  *G02B 21/24* (2006.01)
  *G02B 25/00* (2006.01)
(52) U.S. Cl.
  CPC ......... *G02B 21/36* (2013.01); *G02B 21/361* (2013.01); *G02B 21/365* (2013.01); *G02B 25/001* (2013.01)
(58) Field of Classification Search
  USPC ........................................................ 348/79
  See application file for complete search history.

(56) References Cited

U.S. PATENT DOCUMENTS

| | | | |
|---|---|---|---|
| 7,006,741 B1 * | 2/2006 | Yu | G02B 6/06 385/116 |
| 8,477,416 B2 | 7/2013 | Nakamura | |
| 9,030,541 B2 * | 5/2015 | Kutsuma | A61B 1/00188 348/61 |
| 2002/0041438 A1 * | 4/2002 | Takahama | G02B 21/0088 359/363 |
| 2004/0008867 A1 * | 1/2004 | Fein | G01N 21/6458 382/100 |
| 2004/0017607 A1 * | 1/2004 | Hauger | G02B 21/22 359/376 |
| 2004/0036962 A1 * | 2/2004 | Brunner | G02B 21/0012 359/368 |
| 2004/0062347 A1 * | 4/2004 | Kumakhov | G21K 7/00 378/43 |
| 2004/0193305 A1 * | 9/2004 | Hayashi | G02B 21/32 700/160 |
| 2005/0167595 A1 * | 8/2005 | Prelewitz | G02B 27/48 250/341.1 |
| 2006/0043302 A1 * | 3/2006 | Prelewitz | G02B 27/48 250/341.1 |
| 2007/0139541 A1 * | 6/2007 | Fein | G01N 21/6458 348/294 |
| 2007/0146869 A1 * | 6/2007 | Lauer | G02B 5/005 359/368 |
| 2008/0291534 A1 * | 11/2008 | Okugawa | G02B 21/30 359/395 |
| 2009/0190209 A1 * | 7/2009 | Nakamura | G02B 21/0012 359/375 |

FOREIGN PATENT DOCUMENTS

| | | |
|---|---|---|
| JP | 11-072708 | 3/1999 |
| JP | 2001-066513 | 3/2001 |
| JP | 2002-196258 | 7/2002 |
| JP | 2006-162765 | 6/2006 |
| JP | 2008-006089 | 1/2008 |
| JP | 2009-163201 | 7/2009 |

OTHER PUBLICATIONS

International Preliminary Report on Patentability, dated Nov. 27, 2014, issued in International Application No. PCT/JP2013/062564.

* cited by examiner

FIG. 15A
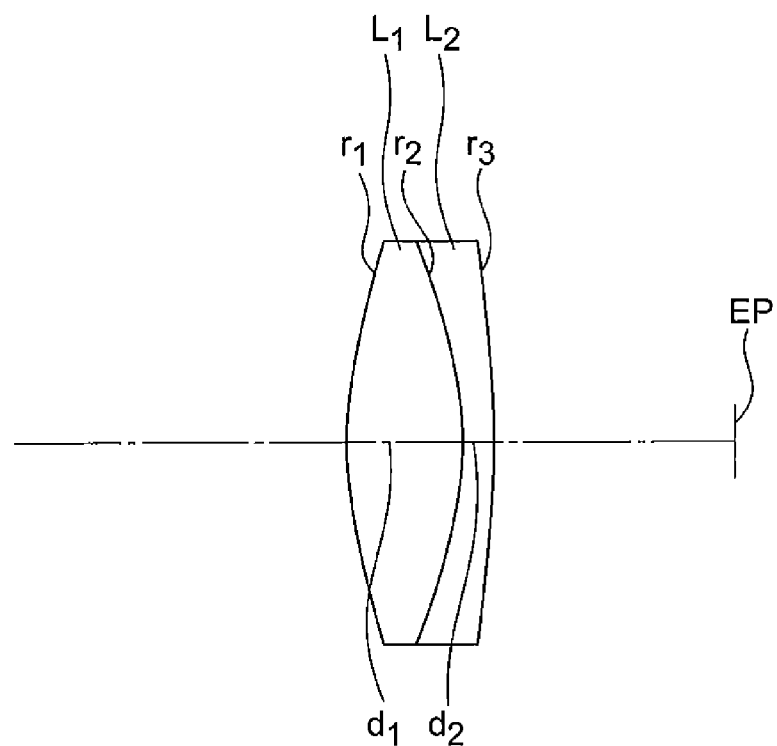
FIG. 15B  FIG. 15C  FIG. 15D
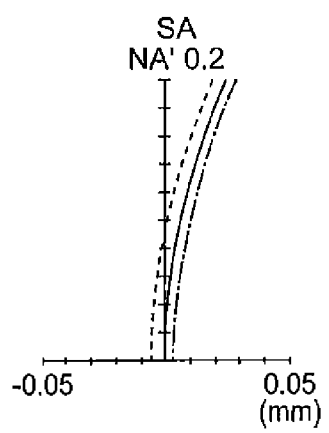
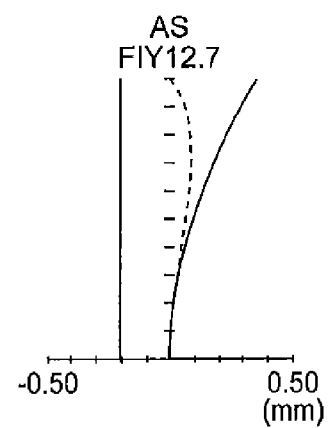
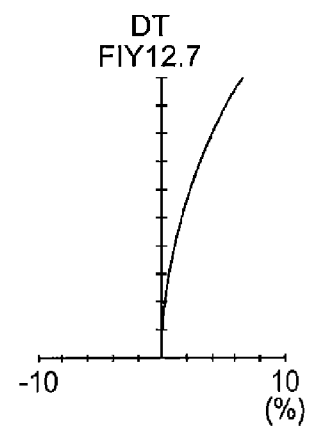

OBSERVATION UNIT AND MICROSCOPE SYSTEM EQUIPPED WITH OBSERVATION UNIT

CROSS-REFERENCE TO RELATED APPLICATIONS

The present application is a continuation application of International application No. PCT/JP2013/062564 filed on Apr. 30, 2013, which is based upon and claims the benefit of priority from the prior Japanese Patent Application No. 2012-112810 filed on May 16, 2012; the entire contents of these applications are incorporated herein by reference.

BACKGROUND OF THE INVENTION

1. Field of the Invention

The present invention relates to an observation unit and a microscope system equipped with the observation unit.

2. Description of the Related Art

An optical microscope was originally an optical device that is used by an observer to observe a sample (i.e. an optical image of a sample) with his/her eye(s). Later, a still camera or a movie camera was appended to some optical microscopes to meet user's demand for recording the appearance of samples (their colors and shapes etc.).

When using an optical microscope, an observer observes a sample with his/her eyes through a binocular barrel (or observation barrel). The binocular barrel houses imaging lens systems and prisms, and eyepieces are attached to it.

Some binocular barrels are equipped with a mechanism for shifting the positions of the eye points horizontally and/or vertically to adjust it to the position of the observer during observation and a mechanism for adjusting the angle (elevation angle) at which the observer looks into the eyepieces (Japanese Patent Application Laid-open Publication Nos. H8-278448 and H11-072708).

Some binocular barrels used for instructional purposes allow a plurality of persons (2 to 10 or more) to observe the same sample. This type of barrel is called a discussion barrel (Japanese Patent Application Laid-open Publication No. H10-213752).

On the other hand, with remarkable improvement in the performance, electronic image pickup elements and image display apparatuses in these times have resolving power and gradation equivalent to human eyes in observing samples. Therefore, in some cases an image of a sample is displayed on an image display device or a monitor to allow an observer(s) to observe the displayed image of the sample instead of observing an image with his/her eyes. Some microscopes used in the above-described way of observation do not have a binocular barrel (Japanese Patent Application Laid-open Publication No. 2006-162765).

SUMMARY OF THE INVENTION

A microscope system according to the present invention comprises a microscope and an observation unit provided separately from the microscope, wherein the microscope comprises a microscope objective lens, an image pickup element disposed at a position at which an image is formed through the microscope objective lens, and a first control apparatus connected with the image pickup element, the observation unit comprises a second control apparatus, a display device connected with the second control apparatus, and a magnifier optical system arranged at a predetermined distance from the display device, the microscope system further comprises a communication apparatus for communication between the first control apparatus and the second control apparatus so that an image picked up by the image pickup apparatus is displayed on the display device.

An observation unit according to the present invention comprises:

a display device that displays a certain input image; and a magnifier optical system arranged at a predetermined distance from the display device, wherein the certain image is an image obtained by picking up an image formed through a microscope objective lens using an image pickup element, and the observation unit satisfies one the following conditional expressions (1A) and (2):

$$0.9 \times \beta_{oc} < (L_d/L_i) \times (250/f_l) < 1.1 \times \beta_{oc}, \text{ and}$$

$$20° < \tan^{-1}(L_d/(2 \times f_l)) < 35° \quad (2)$$

where $\beta_{oc}$ is the magnification of an eyepiece in observation of an optical image, $L_d$ is the diagonal length of a display area of the display device, $L_i$ is the diagonal length of an image pickup area of the image pickup element, and $f_l$ is the focal length of the magnifier optical system.

An observation unit comprises a display device that displays a certain input image; and a magnifier optical system arranged at a predetermined distance from the display device, wherein the certain image is an image obtained by picking up an image formed through a microscope objective lens and an intermediate imaging lens, using an image pickup element, and the observation unit satisfies one the following conditional expressions (1B) and (2):

$$0.9 \times \beta_{oc} < q \times (L_d/L_i) \times (250/f_l) < 1.1 \times \beta_{oc} \quad (1B), \text{ and}$$

$$20° < \tan^{-1}(L_d/(2 \times f_l)) < 35° \quad (2)$$

where $\beta_{oc}$ is the magnification of an eyepiece in observation of an optical image, q is the magnification of the intermediate imaging lens, $L_d$ is the diagonal length of a display area of the display device, $L_i$ is the diagonal length of an image pickup area of the image pickup element, and $f_l$ is the focal length of the magnifier optical system.

BRIEF DESCRIPTION OF THE DRAWINGS

FIG. 3A is a perspective view, and FIG. 3B is a cross sectional view;

FIG. 8A is a perspective view, and FIG. 8B is a cross sectional view;

FIG. 11A is a perspective view, and FIG. 11B is a cross sectional view;

FIG. 15A is a cross sectional view showing the optical configuration of a third example of the magnifier optical system, taken along the optical axis, and FIGS. 15B to 15D are aberration diagrams of this magnifier optical system.

DETAILED DESCRIPTION OF THE INVENTION

In the following, embodiments of the microscope system according to the present invention and examples of the magnifier optical system (loupe optical system) will be described in detail with reference to the drawings. It is to be understood that the present invention is not limited by the embodiments or the examples.

A microscope system according to an embodiment includes a microscope, and an observation unit provided separately from the microscope. The microscope includes a microscope objective lens, an image pickup element disposed at a position at which an image is formed through the microscope objective lens, and a first control apparatus connected with the image pickup element. The observation unit has a second control apparatus, a display device connected with the second control apparatus, and a magnifier optical system arranged at a predetermined distance from the display device. The microscope system further includes a communication apparatus for communication between the first control apparatus and a second control apparatus so that an image picked up by the image pickup element is displayed on the display device.

Figure 1:
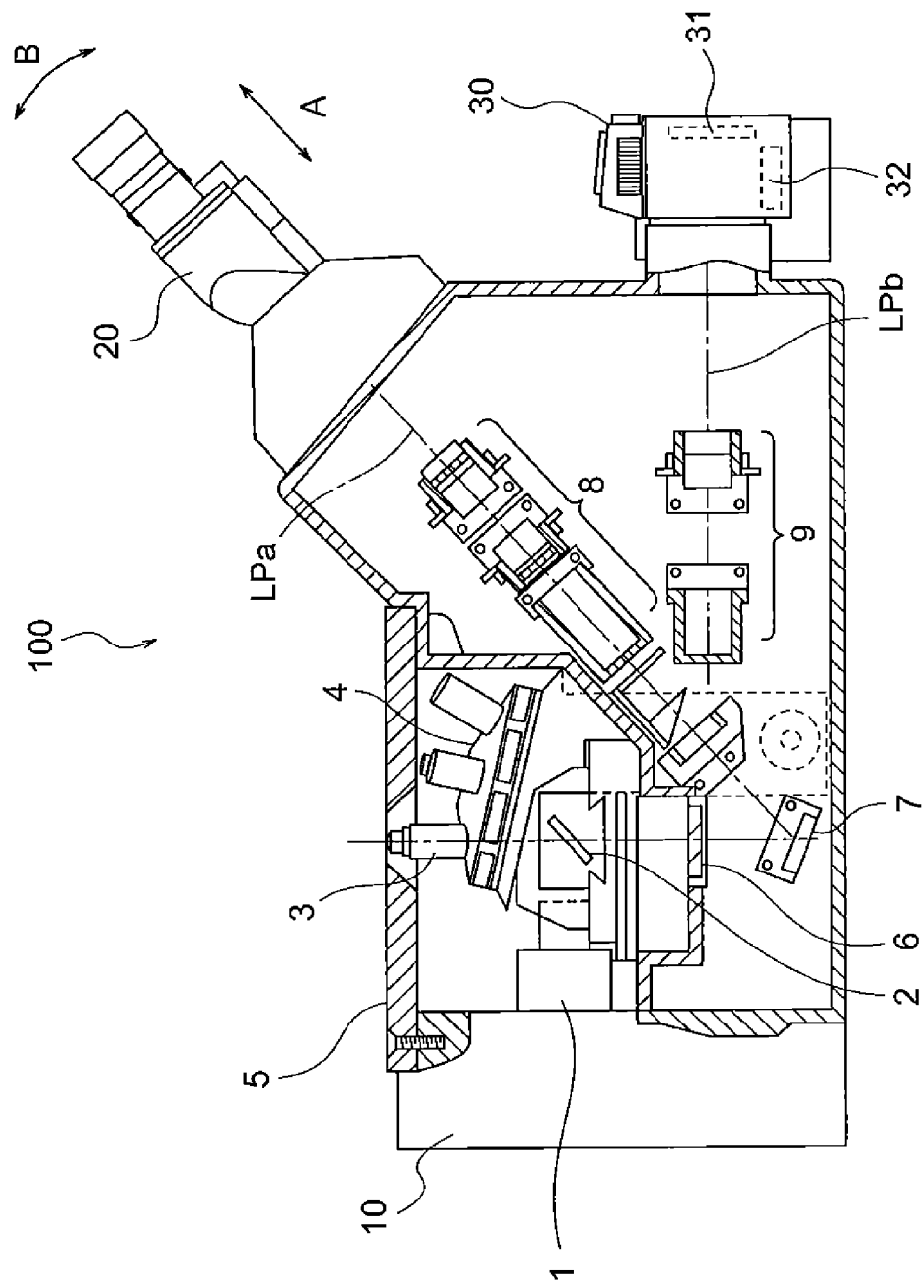
FIG. 1 is a diagram showing the configuration of a microscope system according to a first embodiment.
Figure 2:
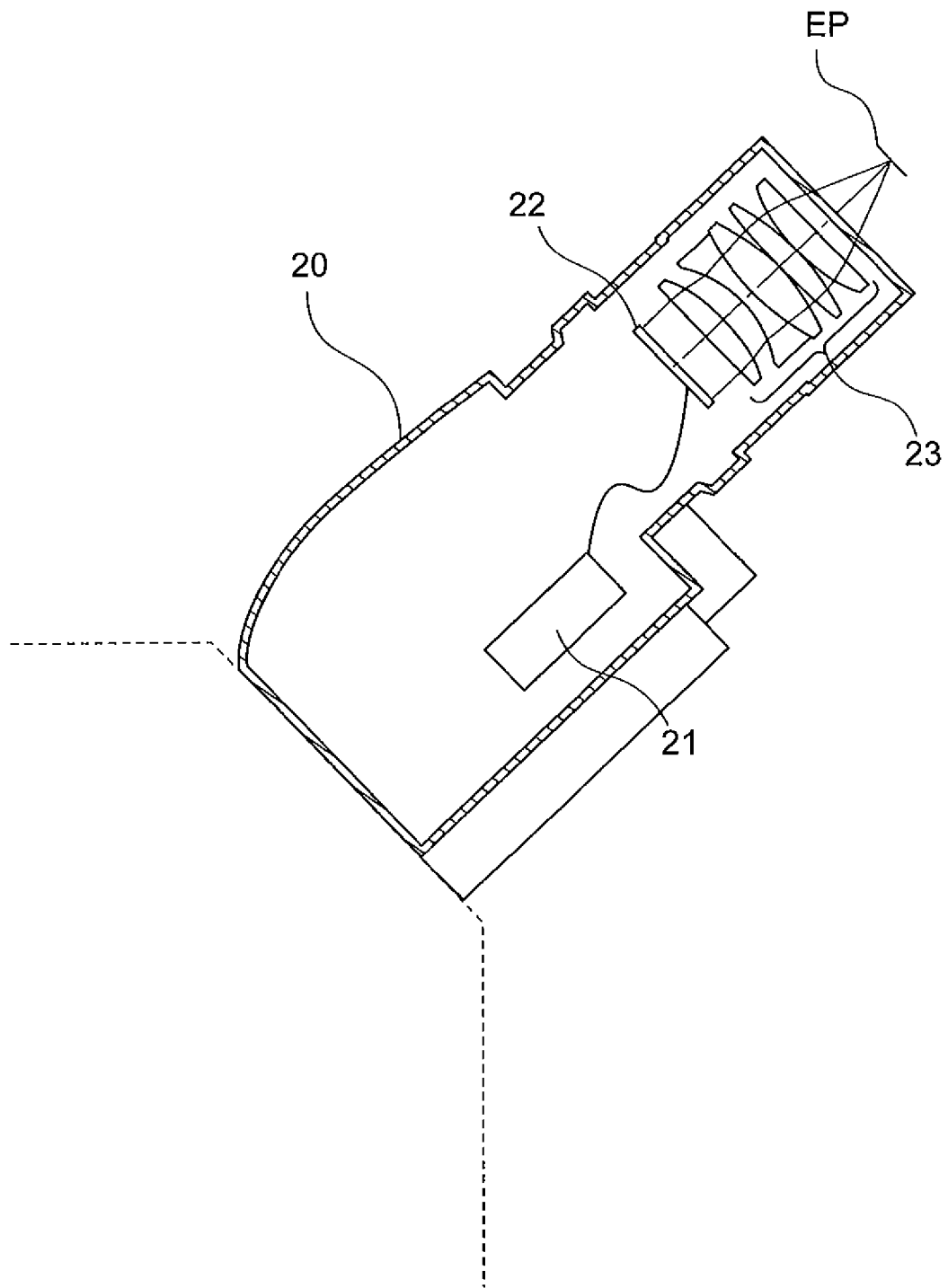
FIG. 2 is a diagram showing the configuration of an observation unit in the microscope system according to the first embodiment.

In the following, the basic configuration of the microscope system of this embodiment will be described based on a first exemplary embodiment of the microscope system. FIG. 1 is a diagram showing the configuration of the microscope system according to the first embodiment. FIG. 2 is a diagram showing the configuration of the observation unit.

As shown in FIG. 1, the microscope system 100 includes a microscope 10 and an observation unit 20. The microscope 10 has a light source unit 1, a half mirror 2, a microscope objective lens 3, a revolver 4, a stage 5, an imaging optical system 6, a mirror 7, an afocal optical system 8, an image taking optical system 9, and an image pickup apparatus 30. The image pickup apparatus 30 includes an image pickup element 31 and a control apparatus (first control apparatus) 32.

The light source unit 1 emits illumination light. The illumination light is reflected by the half mirror 2 and enters the microscope objective lens 3. The microscope objective lens 3 is held by a revolver 4 and arranged below the stage 5. A sample is placed on the stage 5. Thus, the sample is illuminated with the illumination light emerging from the microscope objective lens 3. The light from the sample is transmitted through the microscope objective lens 3 and the half mirror 2 and enters the imaging optical system 6. The light emerging from the imaging optical system 6 is reflected by the half mirror 7 and then focused at a predetermined position. A primary image (optical image) of the sample is formed at this predetermined position.

An observation optical path LPa and an image taking optical path LPb extend along the direction in which the light reflected by the mirror 7 travels. The afocal optical system 8 is provided in the observation optical path LPa, and the image taking optical system 9 is arranged in the image taking optical path LPb. An optical element that guides light into the image taking optical path LPb is provided between the mirror 7 and the afocal optical system 8.

As will be described later, the observation unit 20 in this embodiment is attachable/detachable to/from the microscope 10. Thus, the observation unit 20 is attached to the microscope 10 when in use. The observation unit 20 may be detached and a conventional binocular barrel may be attached to the microscope 10 to allow an observer to observe an image (optical image) of a sample with his/her eyes.

The image pickup apparatus 30 attached to the microscope 10 can pick up an image of the sample. For this purpose, the image pickup apparatus 30 has the image pickup element 31. The image pickup element 31 may be, for example, a CCD image sensor or a CMOS image sensor. The image of the sample is converted into image data (digital data) by the image pickup element 31, and the image data is output to the outside. For the purpose of outputting the image data to the outside, the image pickup apparatus 30 has a control apparatus 32. The control apparatus 32 may be incorporated in the image pickup element 31.

The observation unit 20 in this embodiment is a unit separated from the microscope 10 and attachable/detachable to/from the microscope 10. When observation of the sample is conducted, the observation unit 20 is attached to the microscope 10. The observation unit 20 displays an image (digital image) of the sample on the display device, and the observer observes the image. Therefore, in the microscope system of this embodiment, the microscope 10 necessarily has an image pickup apparatus 30 in order to acquire image data of the sample.

The image pickup element 31 may be arranged in the microscope 10, and the image pickup apparatus 30 may be undetachable from the microscope. While in the case shown in FIG. 1 an image of the sample is picked up through the image taking optical system 9, the image pickup element 31 may be arranged at the position of the primary image of the sample to pick up an image of the sample without using the image taking optical system 9.

The structure of the observation unit 20 will be described with reference to FIG. 2. The observation unit 20 has a control apparatus (second control apparatus) 21, a display device 22, and a magnifier optical system 23. The eye point EP is also shown.

The display device 22 is connected with the control apparatus 21. The control apparatus 21 communicates with the control apparatus 32 of the image pickup apparatus 30. This communication may be performed by means of either wire or wireless. The magnifier optical system 23 is arranged at a certain distance from the display device 22. The display device 22 may be an LCD or an organic EL display. The control apparatus 21 may be incorporated in the display device 22.

As described above, image data of the sample is acquired by the image pickup apparatus 30. The acquired image data of the sample is input to the display device 22 through the control apparatus 32 and the control apparatus 21. Thus, an image of the sample is displayed on the display device 22. The observer observes the image of the sample thus displayed with his/her eye through the magnifier optical system 23. The observation unit 20 differs from conventional binocular barrels, with which an optical image of a sample is observed, in that what is observed is an image or a digital image.

In the microscope system of this embodiment, the optical components needed to observe the image of the sample are only the magnifier optical system 23. Since the microscope system of this embodiment uses a smaller number of optical components than conventional binocular barrels, deterioration in aberrations, deterioration in color reproduction, and lowering of image brightness can be prevented.

The observer observes the image of the sample through the observation unit 20. In this case, the relative position of the observer's eye to the observation unit 20 (the eye point EP) can be kept constant. Therefore, a constant observation magnification can be maintained, and the observer can have a feeling of immersion. This enables the observer to continue the observation with concentration for a long time.

What have been described in the foregoing is the basic features of this embodiment. The microscope systems according to the other embodiments that will be described later also have these basic features.

As described above, in the microscope system of this embodiment, the display device 22 and the magnifier optical system 23 are arranged in the observation unit 20. Therefore, observation of the sample can be conducted using only the observation unit 20, only by inputting the image data of the sample to the observation unit 20. This means that the installation location and orientation of the observation unit 20 can be determined without reference to the observation optical path LPa of the microscope 10.

Therefore, shifts of the eye point in the horizontal and vertical directions can be achieved only by providing a mechanical shift mechanism (or a sliding mechanism) for shifting the observation unit 20 along the direction of arrow A. Moreover, adjustment of the angle (elevation angle) at which the observer looks into the eyepiece (ocular) can be achieved only by providing a mechanical adjusting mechanism (rotating mechanism) for moving it in the direction of arrow B.

Conventionally, the above-described shift and adjustment need a relay optical system and a number of prisms used to align the optical path of the binocular barrel with the observation optical path LPa. The microscope system of this embodiment does not need such optical components. Therefore, even if the microscope system of this embodiment is equipped with the shift mechanism and/or the adjusting mechanism, deterioration in aberrations, deterioration in color reproduction, or lowering of image brightness can be prevented. Moreover, these systems can be made simple.

It is preferred that the microscope system of this embodiment satisfies the following conditional expressions (1A) and (2) while having the above-described basic features:

$$0.9 \times \beta_{oc} < (L_d/L_i) \times (250/f_I) < 1.1 \times \beta_{oc} \quad (1A), \text{ and}$$

$$20° < \tan^{-1}(L_d/(2 \times f_I)) < 35° \quad (2),$$

where $\beta_{oc}$ is the magnification of an eyepiece in observation of an optical image, $L_d$ is the diagonal length of the display area of the display device, $L_i$ is the diagonal length of the image pickup area of the image pickup element, and $f_I$ is the focal length of the magnifier optical system.

Conditional expressions (1A) and (2) are conditions for attaining an appropriate observation magnification and an appropriate angle of view (2ω). In the microscope system of this embodiment, the image of the sample is observed using the observation unit. It is desired that the observation magnification and the angle of view in observation be equal to or substantially equal to the conventional observation magnification and the conventional angle of view. In particular, it is preferred that the deviation of the observation magnification from the conventional observation magnification be within the range of ±10%.

The "conventional observation magnification" mentioned above is the magnification of conventional eyepieces. In the case of conventional microscopes, an optical image (primary image) formed by the microscope objective lens is observed using an eyepiece. The conventional eyepieces refer to such eyepieces. The "conventional angle of view" is the angle of view in observation using a conventional eyepiece.

If conditional expression (1A) is satisfied, the observation magnification in observation of an image of a sample using the observation unit would be equal to or substantially equal to the conventional observation magnification. If conditional expression (2) is satisfied, the angle of view in observation of an image of a sample using the observation unit would be equal to or substantially equal to the conventional angle of view.

If the value of $\tan^{-1}(L_d/(2 \times f_I))$ falls below the lower limit of conditional expression (2), the angle of view is too small, that is, in terms of field number, the field number is smaller than 18, leading to an unduly small observation area as a microscope.

If the value of $\tan^{-1}(L_d/(2 \times f_I))$ exceeds the upper limit of conditional expression (2), the angle of view is too large, that is, in terms of field number, the field number is larger than 35. Then, the flatness of the image (curvature of field) in the microscope objective lens cannot be maintained.

It is preferred that conditional expression (1A) be satisfied in the case where an image (primary image) formed only by the microscope objective lens is picked up by the image pickup element or in the case where an image (primary image) formed only by the microscope objective lens and the imaging lens is picked up by the image pickup element. The microscope objective lens may be either a finite-system objective lens or an infinity-corrected objective lens.

It is preferred that the microscope system of this embodiment include an intermediate imaging lens provided between the microscope objective lens and the image pickup element and satisfy the following conditional expressions (1B) and (2), while having the above-described basic features:

$$0.9 \times \beta_{oc} < q \times (L_d/L_i) \times (250/f_I) < 1.1 \times \beta_{oc} \quad (1B), \text{ and}$$

$$20° < \tan^{-1}(L_d/(2 \times f_I)) < 35° \quad (2)$$

where $\beta_{oc}$ is the magnification of an eyepiece in observation of an optical image, q is the magnification of the intermediate imaging lens, $L_d$ is the diagonal length of the display area of the display device, $L_i$ is the diagonal length of the image pickup area of the image pickup element, and $f_I$ is the focal length of the magnifier optical system.

The technical significance (operational effects) of conditional expression (1B) is the same as conditional expression (1A). The technical significance (operational effects) of conditional expression (2) has been described above.

It is preferred that conditional expression (1B) be satisfied in the case where an image (primary image) formed only by the microscope objective lens is picked up by the image pickup element through the intermediate imaging lens or in the case where an image formed only by the microscope objective lens and the imaging lens is picked up by the image pickup element through the intermediate imaging lens. The microscope objective lens may be either a finite-system objective lens or an infinity-corrected objective lens. If the magnification of the intermediate imaging lens is 1 (unity), conditional expression (1B) is equivalent to conditional expression (1A).

It is preferred that the microscope system of this embodiment satisfies the following conditional expression (3):

$$8 \leq \beta_{oc} \leq 30 \qquad (3),$$

where $\beta_{oc}$ is the magnification of an eyepiece in observation of an optical image.

It is preferred that the following conditional expression (3') be satisfied instead of conditional expression (3).

$$10 \leq \beta_{oc} \leq 15 \qquad (3').$$

It is more preferred that the following conditional expression (3") be satisfied instead of conditional expression (3).

$$\beta_{oc} = 10 \qquad (3'').$$

Figure 3A:
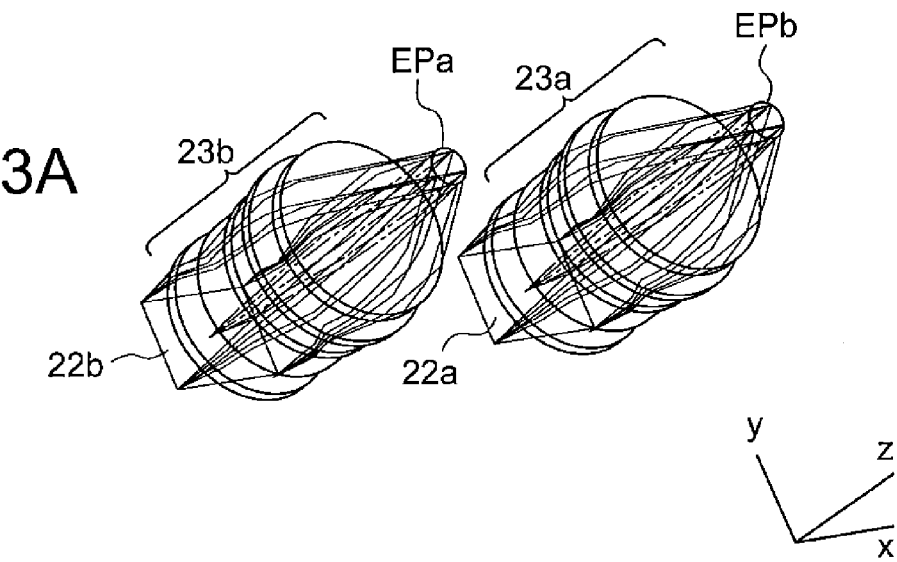
FIGS. 3A and 3B include diagrams showing magnifier optical systems for the microscope system according to the first embodiment, where
Figure 3B:
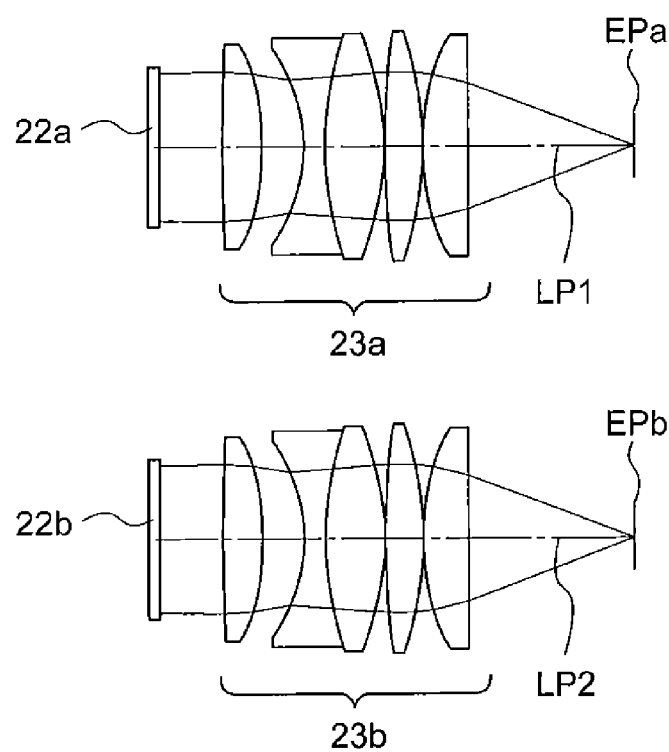

A preferred specific example of the magnifier optical system shown in FIG. 2 will be described. FIGS. 3A and 3B include diagrams showing the magnifier optical systems, where FIG. 3A is a perspective view, and FIG. 3B is a cross sectional view taken along the z-axis. As shown in FIGS. 3A and 3B, the observation unit 20 has two display devices and two magnifier optical systems. The magnifier optical systems shown in FIGS. 3A and 3B are magnifier optical systems of a first example, which will be described later.

The observation unit 20 has a display device 22a and, additionally, another display device 22b. The observation unit 20 also has a magnifier optical system 23a and, additionally, another magnifier optical system 23b. The display device 22a and the magnifier optical system 23a are arranged in a first optical path LP1. The display device 22b and the magnifier optical system 23b are arranged in a second optical path LP2. In this way, the magnifier optical system 23a and the magnifier optical system 23b are arranged side by side. The display device 22a and the display device 22b are also arranged side by side. The optical path is defined to be a line connecting the center of the eye point EP and the center of the display device 22.

The optical axis (center axis) of the magnifier optical system 23a and the center of the eye point EPa coincide with each other. The optical axis (center axis) of the magnifier optical system 23b and the center of the eye point EPb also coincide with each other. The first optical path LP1 and the second optical path LP2 are parallel to each other. The distance between the first optical path LP1 and the second optical path LP2 is equal to an average pupil distance of observers.

Figure 4:
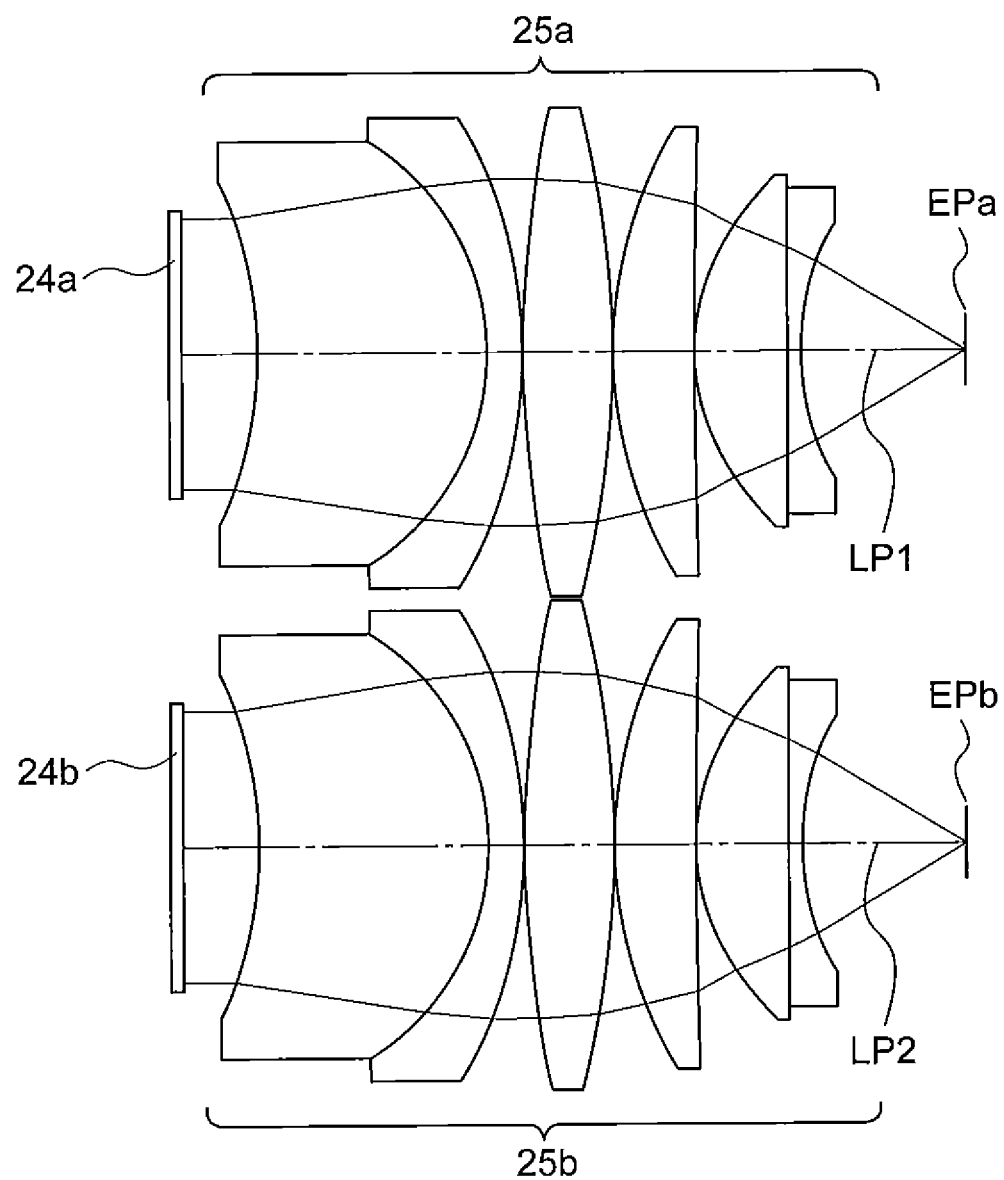
FIG. 4 is a diagram showing other magnifier optical systems for the microscope system according to the first embodiment.

FIG. 4 is a cross sectional view taken along the z-axis showing magnifier optical systems different from the magnifier optical systems shown in FIGS. 3A and 3B. The magnifier optical systems shown in FIG. 4 are magnifier optical systems of a second example, which will be described later. As shown in FIG. 4, a display device 24a and a magnifier optical system 25a are arranged in a first optical path LP1. A display device 24b and a magnifier optical system 25b are arranged in a second optical path LP2. In this way, the magnifier optical system 25a and the magnifier optical system 25b are arranged side by side. The display device 24a and the display device 24b are also arranged side by side.

While the observation unit of the first embodiment has two display devices and two magnifier optical systems, it does not have a reflecting member. In the case of the observation unit having this configuration, it is preferred that the following conditional expression (4) be satisfied:

$$12 \text{ mm} < f_I \leq 50 \text{ mm} \qquad (4),$$

where $f_I$ is the focal length of the magnifier optical systems.

The observation unit 20 may be provided with an adjusting mechanism for changing the distance between the two magnifier optical systems. This allows the distance between the magnifier optical system 23a and the magnifier optical system 23b or the distance between the eye point EPa and the eye point EPb to be adjusted so that it is adapted to the user. This adjustment mechanism may also be provided in the microscope systems according to the second to fourth embodiments, which will be described later.

It is preferred that the observation unit 20 be provided with a shift mechanism for shifting at least one of the two magnifier optical systems along their optical axis. This facilitates focus adjustment. This adjusting mechanism may also be provided in the microscope systems according to the second to fourth embodiments, which will be described later.

Figure 5A:
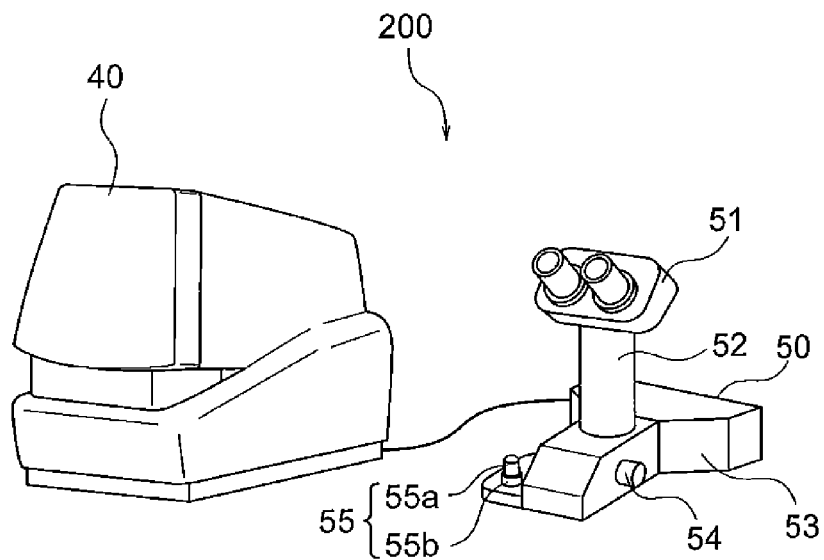
FIG. 5A is an overall perspective view of a microscope system according to a second embodiment.
Figure 5B:
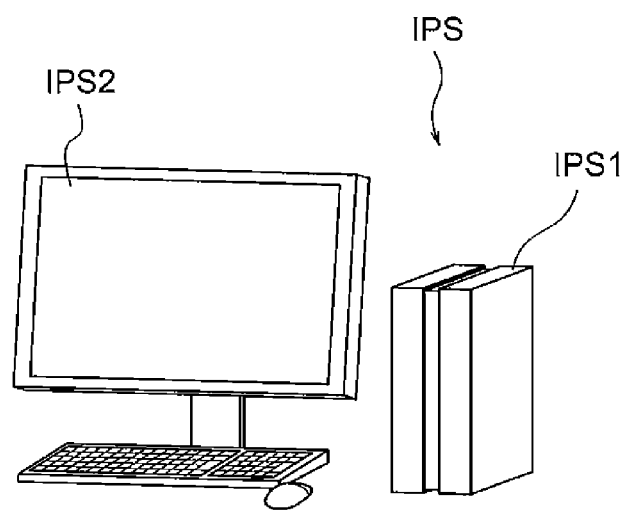
FIG. 5B is an overall perspective view of an image processing system.
Figure 6:
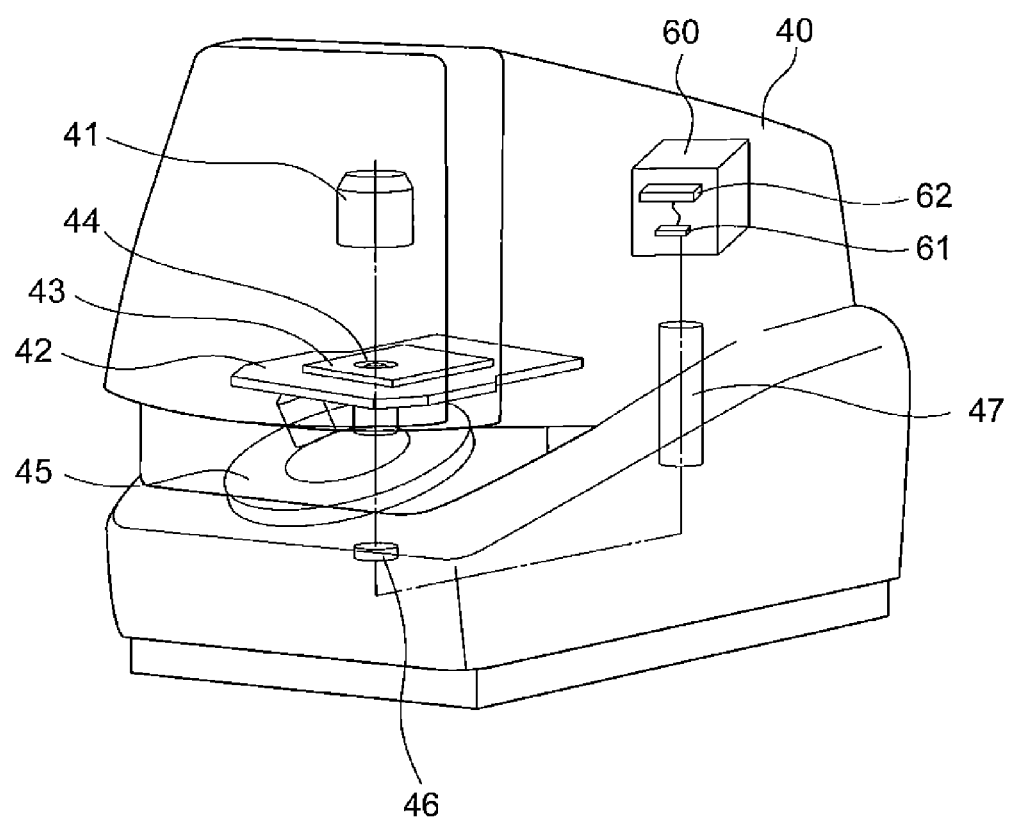
FIG. 6 is a diagram showing the structure of a microscope in the microscope system according to the second embodiment.

The microscope system according to the second embodiment will now be described with reference to FIGS. 5A, 5B, and 6. FIG. 5A is an overall perspective view of the microscope system. FIG. 5B is an overall perspective view of an image processing system. FIG. 6 is a diagram showing the structure of a microscope in the microscope system.

As shown in FIG. 5A, the microscope system 200 includes a microscope 40 and an observation unit 50. An image processing system IPS shown in FIG. 5B may be used with the microscope system 200. The image processing system IPS includes an image processing apparatus IPS1 and a display apparatus IPS2.

As shown in FIG. 6, the microscope 40 has a light source unit 41, a stage 42, a holder 43, a microscope objective lens 44, a revolver 45, an imaging optical system 46, an image taking optical system 47, and an image pickup apparatus 60. The image pickup apparatus 60 includes an image pickup element 61 and a control apparatus (first control apparatus) 62. The basic features of the microscope 40 are the same as those of the microscope 10 in the first embodiment, and they will not be further described.

The observation unit 50 in this embodiment is a unit separated from the microscope 40 and cannot be attached to the microscope 40. Therefore, the observation unit 50 is used in a state separated from the microscope 40. In the observation unit 50, an image of a sample is displayed on the display apparatus, and an observer observes the image. Therefore, in the microscope system of this embodiment, the microscope 40 necessarily has the image pickup apparatus 60 in order to acquire image data of the sample.

The observation unit 50 has an eyepiece part 51, a column 52, a base 53, a first operation part 54, and a second operation part 55. The column 52, the first operation part 54, and the second operation part 55 are attached to the base 53, and the eyepiece part 51 is attached to the column 52.

The first operation part 54 and the second operation part 55 include rotary knobs. Rotating the knob of the first operation part 54 can bring the sample into focus in the microscope 40. Rotating the knob of the second operation part 55 can shift the sample in the microscope 40. The second operation part 55 is provided with two knobs 55a, 55b so that the sample can be shifted in two direction perpendicular to each other. The observer can perform focusing on the sample and adjust the observation position by operating the first operation part 54 and the second operation part 55 while looking into the eyepiece part 51.

Figure 7:
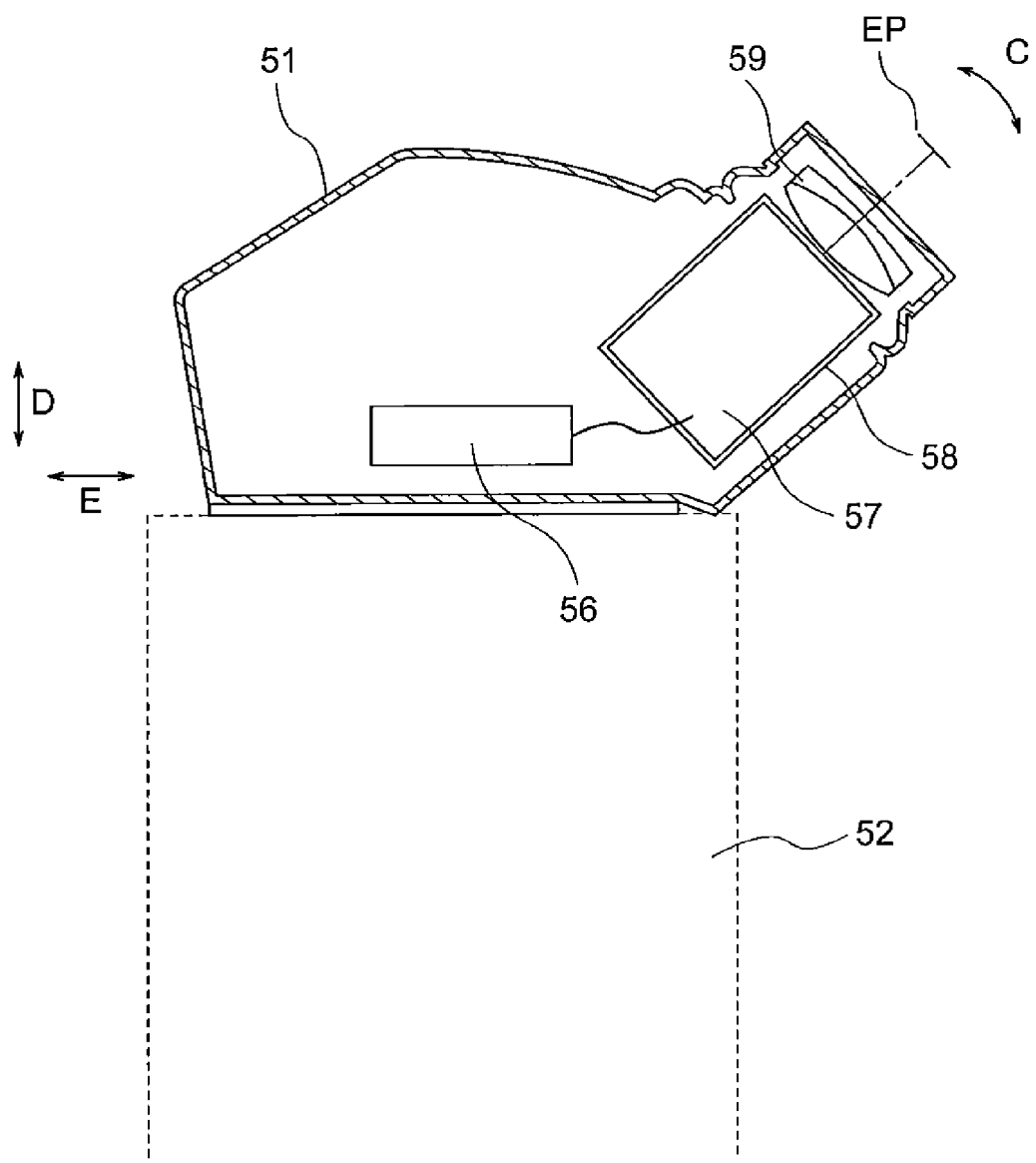
FIG. 7 is a diagram showing the structure of an observation unit in the microscope system according to the second embodiment.

The structure of the eyepiece part 51 of the observation unit 50 will now be described with reference to FIG. 7. FIG. 7 is a diagram showing the structure of the eyepiece part 51. The eyepiece part 51 includes a control apparatus (second control apparatus) 56, a display device 57, a mirror (reflecting member) 58, and a magnifier optical system 59.

The display device 57 is connected with the control apparatus 56. The control apparatus 56 communicates with the control apparatus 62 of the image pickup apparatus 60. This communication may be performed by means of either wire or wireless. The magnifier optical system 59 is arranged at a certain distance from the display device 57. Furthermore, a mirror 58 is provided between the display device 57 and the magnifier optical system 59. Thus, light of the image displayed on the display device 57 is reflected by the mirror 58 and enters the magnifier optical system 59.

As described above, image data of the sample is acquired by the image pickup apparatus 60. The acquired image data of the sample is input to the display device 57 through the control apparatus 62 and the control apparatus 56. Thus an image of the sample is displayed on the display device 57. The observer observes the displayed image of the sample with his/her eyes through the mirror 58 and the magnifier optical system 59. The observation unit 50 differs from conventional binocular barrels, with which an optical image of a sample is observed, in that what is observed is an image or a digital image.

In the microscope system of this embodiment, the optical components needed to observe the image of the sample are only the mirror 58 and the magnifier optical system 59. Since the microscope system of this embodiment uses a smaller number of optical components than conventional binocular barrels, deterioration in aberrations, deterioration in color reproduction, and lowering of image brightness can be prevented.

The observer observes the image of the sample through the observation unit 50. In this case, the relative position of the observer's eye to the observation unit 50 (the eye point EP) can be kept constant. Therefore, a constant observation magnification can be maintained, and the observer can have a feeling of immersion. This enables the observer to continue the observation with concentration for a long time.

As with the microscope system of the first embodiment, the microscope system of this embodiment may be provided with mechanisms for adjusting the position of the eye point and the elevation angle. For example, the eyepiece part 51 may be constructed as two structural parts, and the display device 57, the mirror 58, and the magnifier optical system 59 may be provided in one of the structural parts. The elevation angle can be adjusted by rotating one structural part relative to the other structural part (arrow C). Moreover, making the length of the column 52 variable allows the position of the eye point to be shifted in the vertical direction (arrow D). Providing a slide mechanism in the coupling portion of the eyepiece part 51 and the column 52 allows the eye point to be shifted in the horizontal direction (arrow E).

Figure 8A:
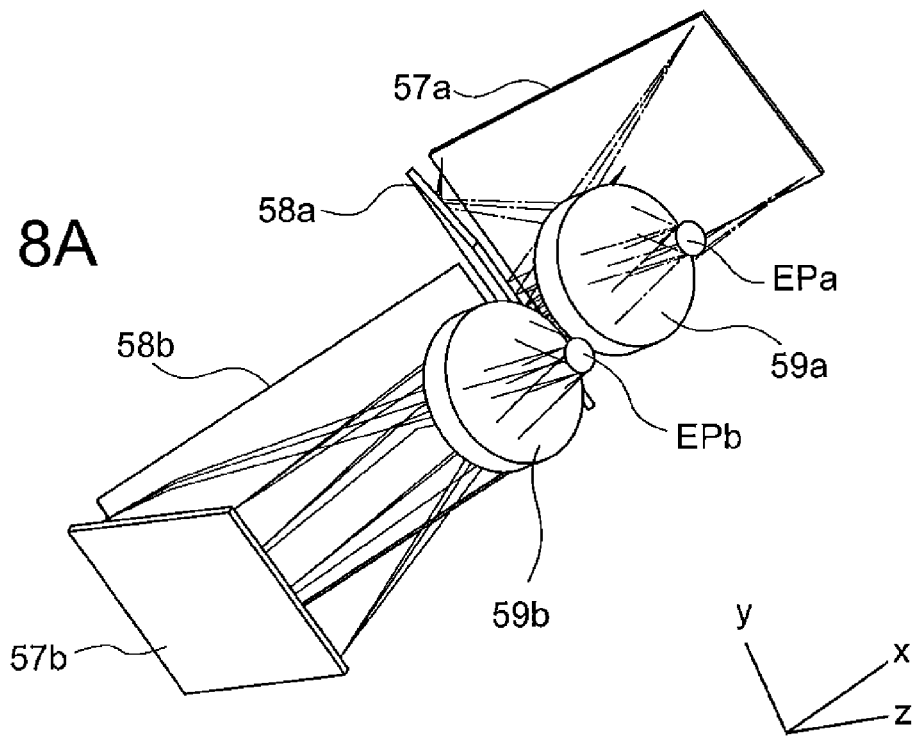
FIGS. 8A and 8B include diagrams showing magnifier optical systems in the microscope system according to the second embodiment, where
Figure 8B:
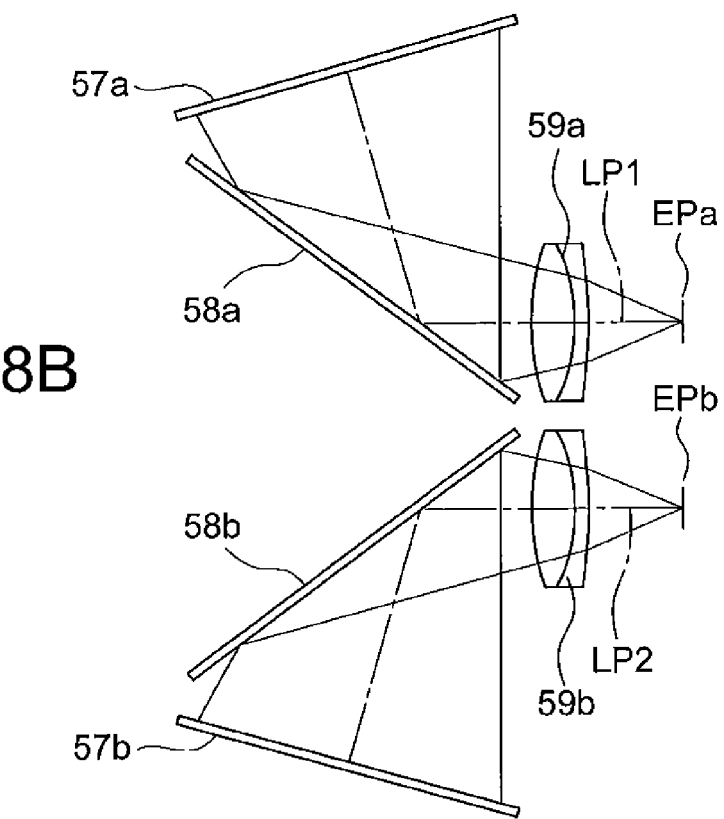

A preferred example of the magnifier optical system shown in FIG. 7 will now be described. FIGS. 8A and 8B includes diagrams showing magnifier optical systems, where FIG. 8A is a perspective view, and FIG. 8B is a cross sectional view taken along the z-axis. As shown in FIGS. 8A and 8B, the eyepiece part 51 of the observation unit 50 includes two display devices, two mirrors (reflecting members), and two magnifier optical systems. The magnifier optical systems shown in FIGS. 8A and 8B are magnifier optical systems of a third example, which will be described later.

The observation unit 50 has a display device 57a and, additionally, another display device 57b. The observation unit 50 also has a mirror 58a and, additionally, another mirror 58b. The observation unit 50 also has a magnifier optical system 59a and, additionally, another magnifier optical system 59b. The display device 57a, the mirror 58a, and the magnifier optical system 59a are arranged in a first optical path LP1. The display device 57b, the mirror 58b, and the magnifier optical system 59b are arranged in a second optical path LP2. In this way, the magnifier optical system 59a and the magnifier optical system 59b are arranged side by side. The display device 57a and the display device 57b are also arranged side by side. The mirror 58a and the mirror 58b are arranged side by side.

The optical axis (center axis) of the magnifier optical system 59a and the center of the eye point EPa coincide with each other. The optical axis (center axis) of the magnifier optical system 59b and the center of the eye point EPb also coincide with each other. The first optical path LP1 and the second optical path LP2 are parallel to each other. The distance between the first optical path LP1 and the second optical path LP2 is equal to an average pupil distance of observers.

The observation unit in the second embodiment has two display devices, two reflecting members, and two magnifier optical systems. In this case, it is preferred that the following conditional expression (5) be satisfied:

$$50 \text{ mm} < f_l < 150 \text{ mm} \tag{5}$$

where $f_l$ is the focal length of the magnifier optical system.

As with the observation unit 20 in the first embodiment, the observation unit 50 in this embodiment has display devices and magnifier optical systems, and the observer observes images displayed on the display devices through the magnifier optical systems. Therefore, the microscope system of this embodiment also enjoys operational effects same as the microscope system of the first embodiment.

When the image processing system IPS is used with the microscope system 200, images acquired by the image pickup apparatus 60 of the microscope 40 can be output to the observation unit 50 through the image processing apparatus IPS1. This allows the image processing apparatus IPS1 to apply various image processing on the image data. Moreover, the image observed on the observation unit 50 can be displayed on the display apparatus IPS2.

Figure 9:
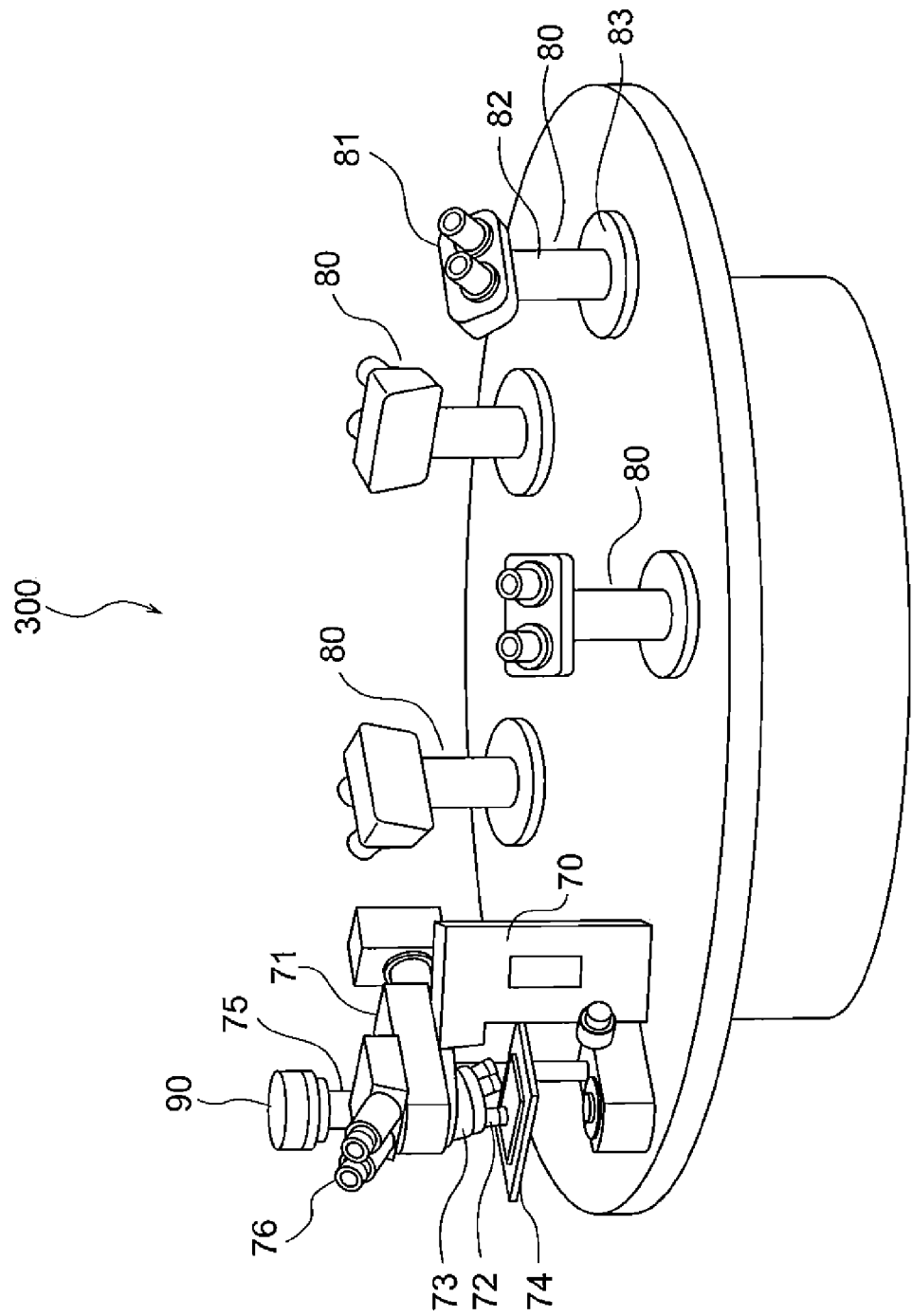
FIG. 9 is an overall perspective view of a microscope system according to a third embodiment.
Figure 10:
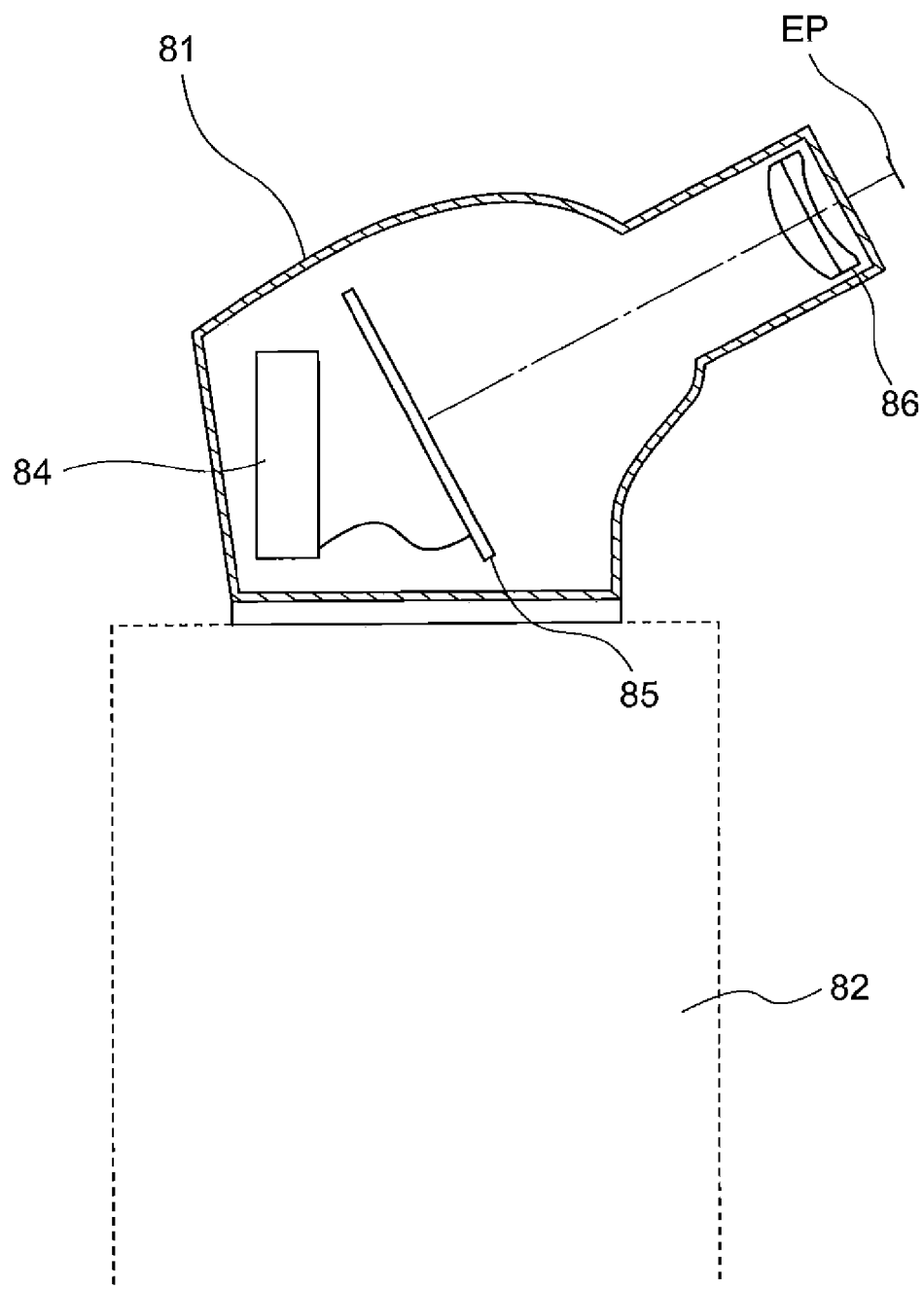
FIG. 10 is a diagram showing the structure of an observation unit in the microscope system according to the third embodiment.

A microscope system according to a third embodiment will be described with reference to FIGS. 9 and 10. FIG. 9 is an overall perspective view of the microscope system. FIG. 10 is a diagram showing the structure of an observation unit (eyepiece part).

As shown in FIG. 9, the microscope system 300 includes a microscope 70 and observation units 80. The microscope 70 has a light source unit 71, a microscope objective lens 72, a revolver 73, a stage 74, an image taking optical system 75, a binocular barrel 76, and an image pickup apparatus 90. The image pickup apparatus 90 has an image pickup element and a control apparatus (first control apparatus), which are not shown in FIG. 9. The basic features of the microscope 70 are the same as the microscope 10 in the first embodiment and will not be described.

The observation unit 80 in this embodiment is a unit separated from the microscope 70 and cannot be attached to the microscope 70. Therefore, the observation unit 80 is used in a state separated from the microscope 70. In the observation unit 80, an image of a sample is displayed on the display apparatus, and an observer observes the image. Therefore, in the microscope system of this embodiment, the microscope 70 necessarily has the image pickup apparatus 90 in order to acquire image data of the sample.

The observation unit 80 has an eyepiece part 81, a column 82, and a base 83. The column 82 is attached to the base 83, and the eyepiece part 81 is attached to the column 82.

The structure of the eyepiece part 81 of the observation unit 80 will now be described with reference to FIG. 10. The eyepiece part 81 has a control apparatus (second control apparatus) 84, a display device 85, and magnifier optical systems 86.

The display device 85 is connected with the control apparatus 84. The control apparatus 84 communicates with the control apparatus of the image pickup apparatus 90. This communication may be performed by means of either wire or wireless. The magnifier optical systems 86 are arranged at a certain distance from the display device 85.

As described above, image data of the sample is acquired by the image pickup apparatus 90. The acquired image data of the sample is input to the display device 85 through the control apparatus of the image pickup apparatus 90 and the control apparatus 84. Thus, an image of the sample is displayed on the display device 85. The observer observes the image of the sample thus displayed with his/her eyes through the magnifier optical systems 86. The observation unit 80 differs from conventional binocular barrels, with which an optical image of a sample is observed, in that what is observed is an image or a digital image.

In the microscope system of this embodiment, the optical components needed to observe the image of the sample are only the magnifier optical systems 86. Since the microscope system of this embodiment uses a smaller number of optical components than conventional binocular barrels, deterioration in aberrations, deterioration in color reproduction, and lowering of image brightness can be prevented.

The observer observes the image of the sample through the observation unit 80. In this case, the relative position of the observer's eyes to the observation unit 80 (the eye points EP) can be kept constant. Therefore, a constant observation magnification can be maintained, and the observer can have a feeling of immersion. This enables the observer to continue the observation with concentration for a long time.

As with the microscope systems of the first and second embodiments, the microscope system of this embodiment may be provided with mechanisms for adjusting the position of the eye point and the elevation angle.

Figure 11A:
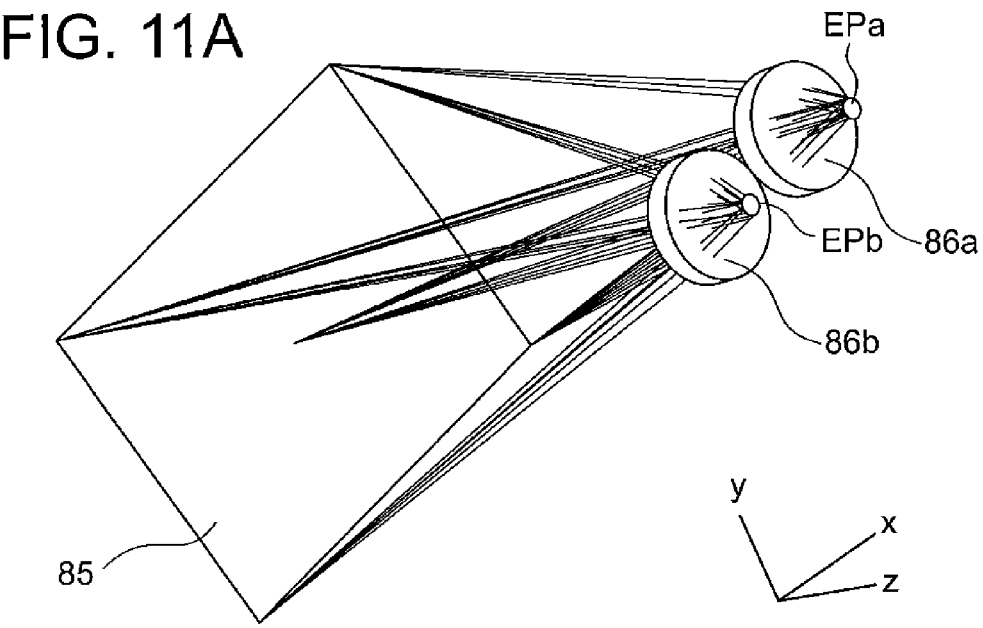
FIGS. 11A and 11B include diagrams showing magnifier optical systems in the microscope system according to the third embodiment, where
Figure 11B:
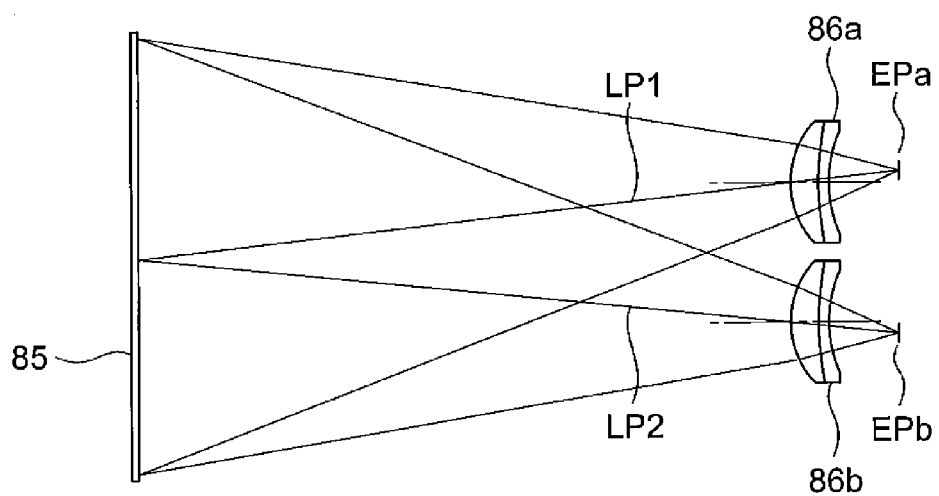

A preferred specific example of the magnifier optical systems shown in FIG. 10 will now be described. FIGS. 11A and 11B includes diagrams showing the magnifier optical systems, where FIG. 11A is a perspective view, and FIG. 11B is a cross sectional view taken along the z-axis. As shown in FIGS. 11A and 11B, the eyepiece part 81 of the observation unit 80 has one display device and two magnifier optical systems. The magnifier optical systems shown in FIGS. 11A and 11B are magnifier optical systems of a fourth example, which will be described later.

The eyepiece part 81 has a magnifier optical system 86a and, additionally, a magnifier optical system 86b. The magnifier optical system 86a is arranged in a first optical path LP1. The magnifier optical system 86b is arranged in a second optical path LP2. In this way, the magnifier optical system 86a and the magnifier optical system 86b are arranged side by side. The display device 85 is arranged in such a way as to contain the first optical path LP1 and the second optical path LP2.

The optical axis (center axis) of the magnifier optical system 86a and the center of the eye point EPa do not coincide with each other. The center of the eye point EPa is located outside the optical axis of the magnifier optical system 86a. Similarly, the optical axis (center axis) of the magnifier optical system 86b and the center of the eye point EPb do not coincide with each other. The center of the eye point EPb is located outside the optical axis of the magnifier optical system 86b.

The first optical path LP1 and the second optical path LP2 are not parallel. The distance between the first optical path LP1 and the second optical path LP2 is equal to an average pupil distance of observers.

While the observation unit in the third embodiment has one display device and two magnifier optical systems, it does not have a reflecting member. In this case, it is preferred that the following conditional expression (6) be satisfied:

$$100 \text{ mm} < f_l < 300 \text{ mm} \tag{6}$$

where $f_l$ is the focal length of the magnifier optical system.

As with the observation unit 20 in the first embodiment, the observation unit 80 in this embodiment has a display device and magnifier optical systems, and the observer observes an image displayed on the display device through the magnifier optical systems. Therefore, the microscope system of this embodiment also enjoys operational effects same as the microscope of the first embodiment.

The microscope systems of this embodiment have a plurality of observation units 80. No optical components are provided between the microscope 70 and the observation units 80 or between the observation units 80. Thus, the number of optical components used in the microscope system of this embodiment is smaller than that in conventional binocular barrels. Therefore, deterioration in aberrations, deterioration in color reproduction, and lowering of image brightness can be prevented.

Moreover, there is no structure that restricts the positions of the microscope 70 and the observation units 80 between them. There is no structure that restricts the positions of the observation units 80 between them. Therefore, the microscope 70 and the observation units 80 can be arranged without restraint.

An image of a sample acquired by the image pickup apparatus 90 is displayed on each of the observation units 80. Therefore, a plurality of observers can observe the same sample. As described above, the microscope 70 and the observation units 80 are arranged without restraint. Therefore, the observers are not forced to take an uncomfortable position.

Figure 12:
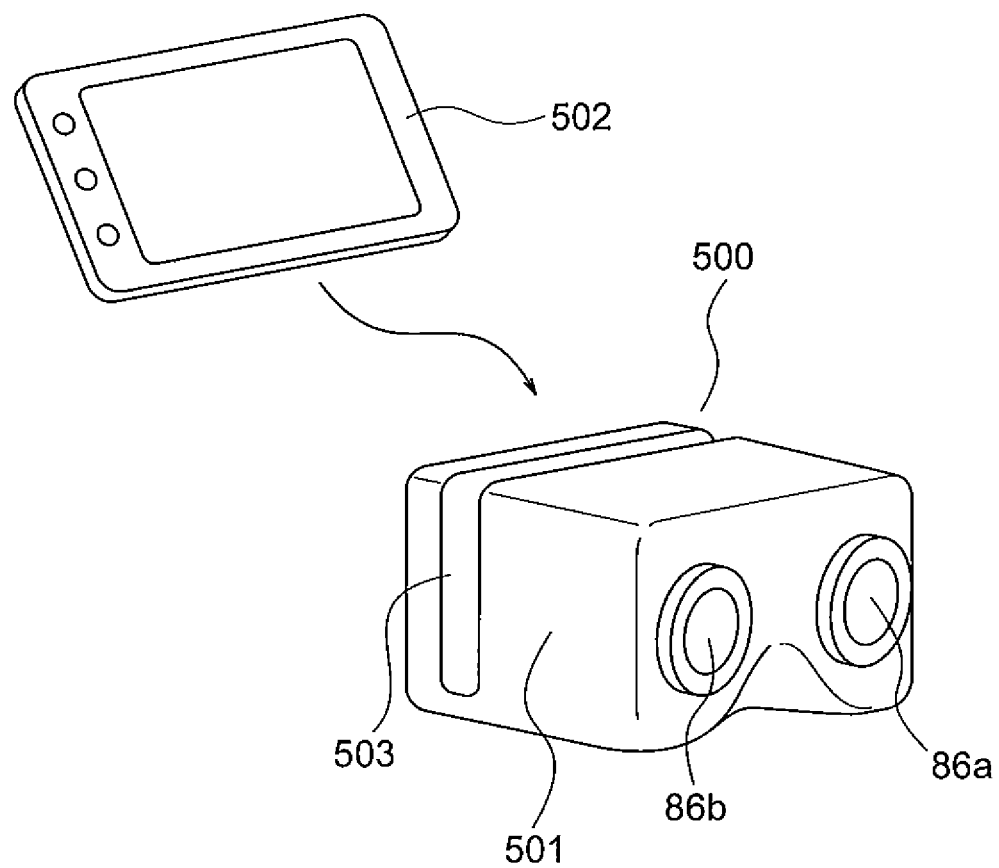
FIG. 12 is a diagram showing the configuration of an observation unit in a microscope system according to a fourth embodiment.
Figure 13A:
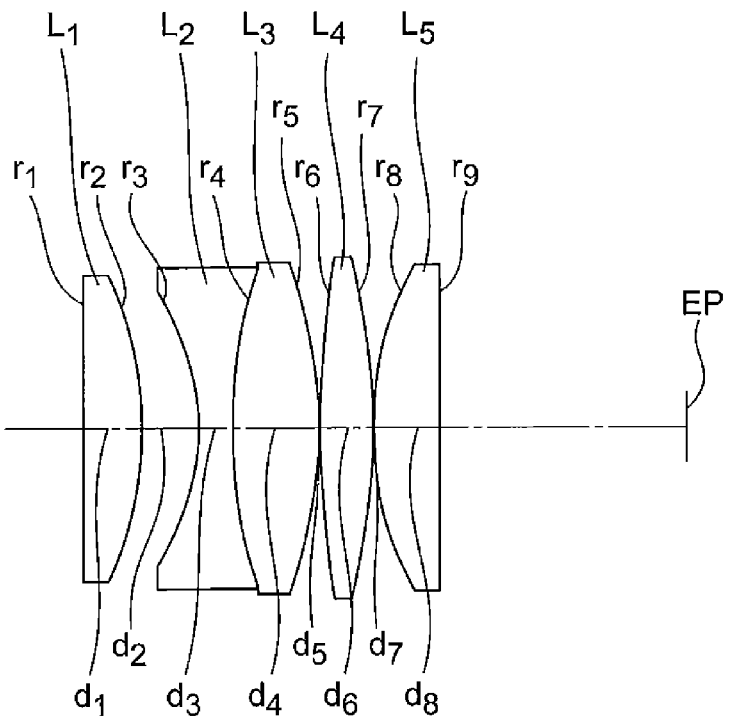
FIG. 13A is a cross sectional view showing the optical configuration of a first example of the magnifier optical system, taken along the optical axis.
Figures 13B, 13C, 13D:
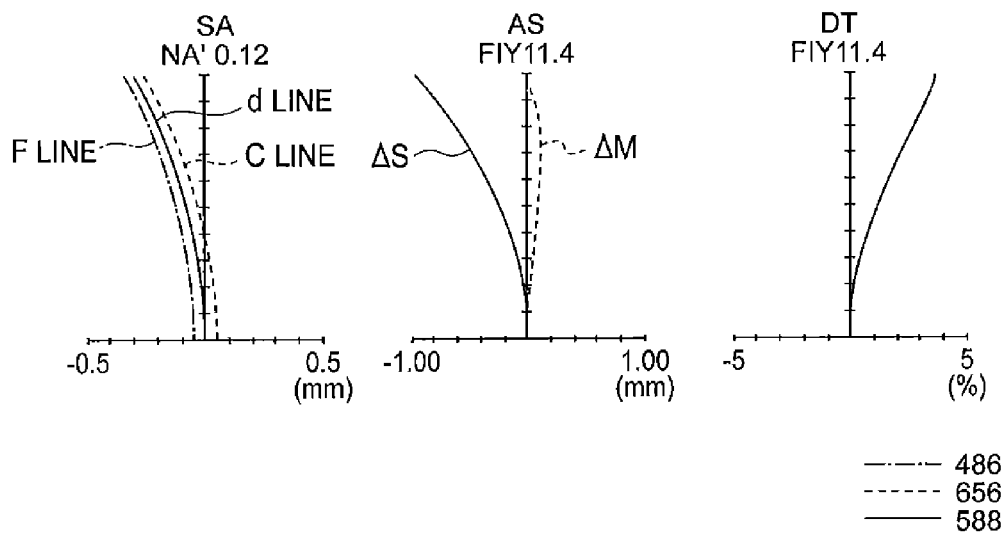
FIGS. 13B to 13D are aberration diagrams of this magnifier optical system.
Figure 14A:
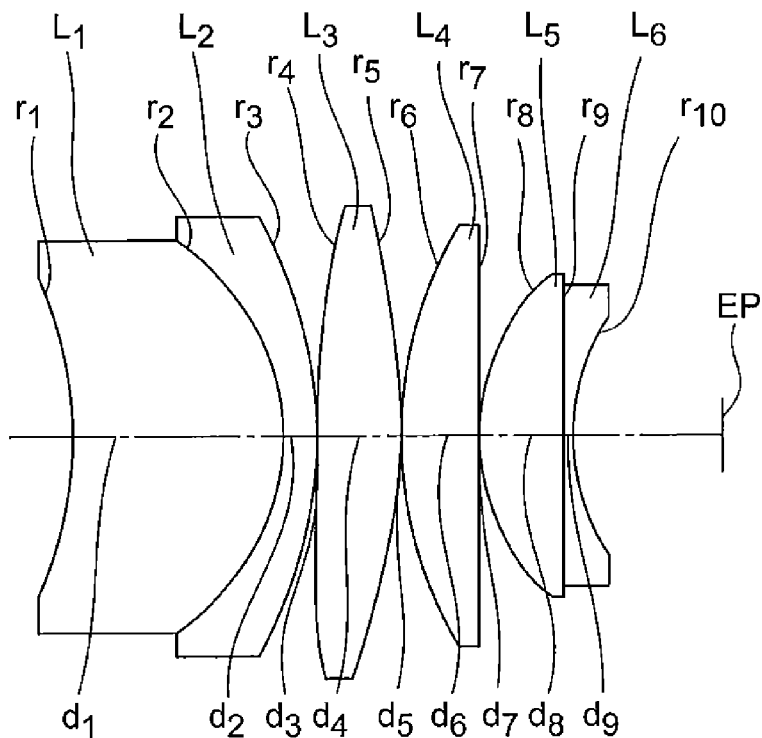
FIG. 14A is a cross sectional view showing the optical configuration of a second example of the magnifier optical system, taken along the optical axis.
Figures 14B, 14C, 14D:
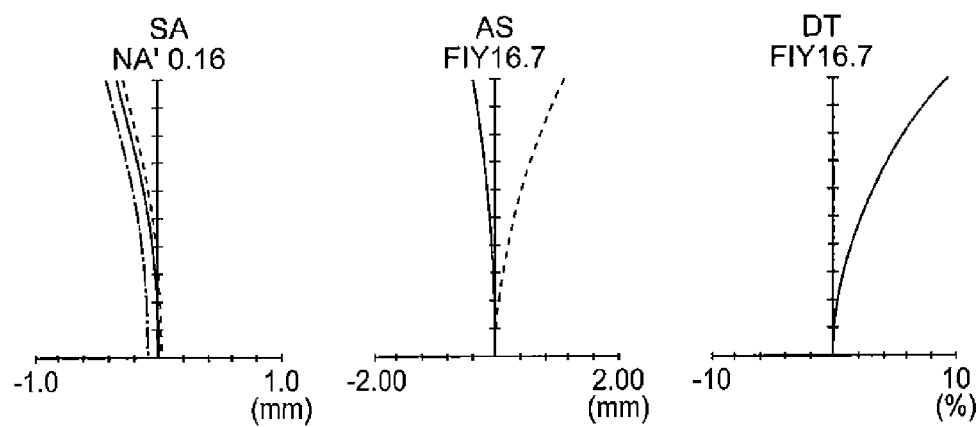
FIGS. 14B to 14D are aberration diagrams of this magnifier optical system.
Figure 16A:
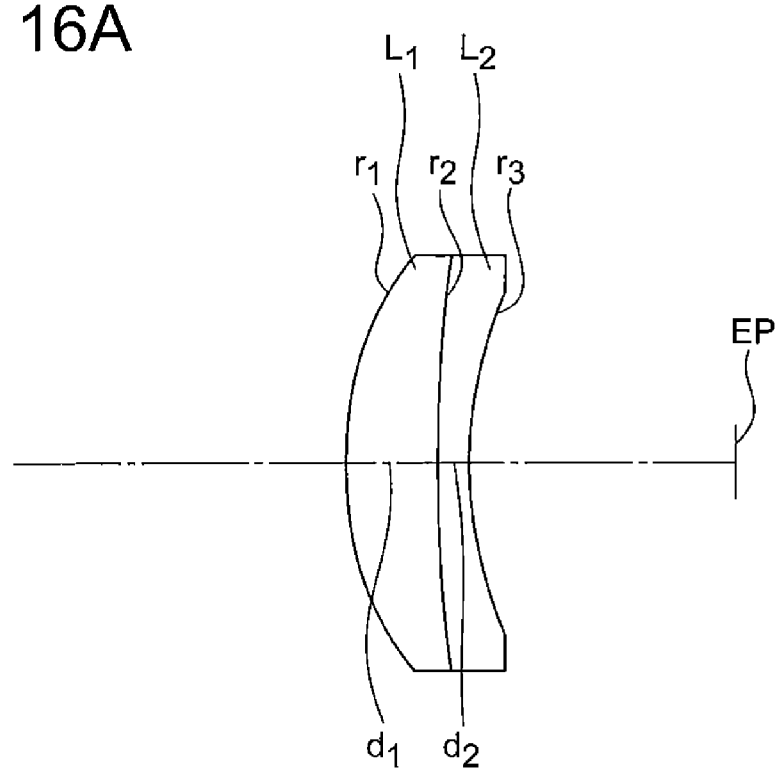
FIG. 16A is a cross sectional view showing the optical configuration of a fourth example of the magnifier optical system taken along the optical axis.
Figure 16B:
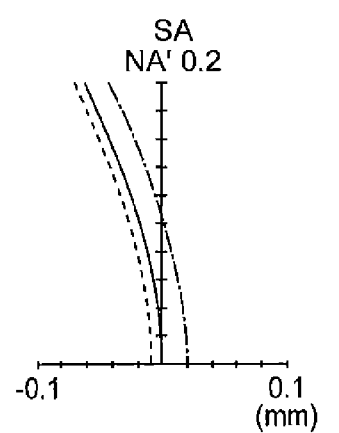
FIGS. 16B to 16D are aberration diagrams of this magnifier optical system.
Figure 16C:
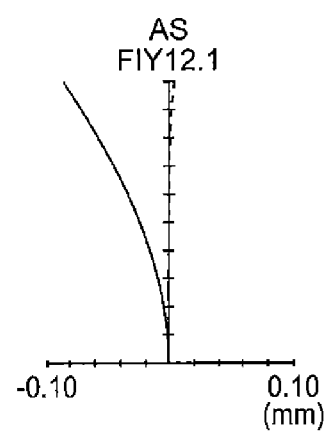
Figure 16D:
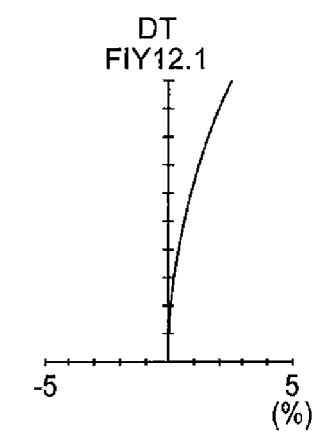

A microscope system according to a fourth embodiment will be described with reference to FIG. 12. The microscope used in the microscope system of this embodiment is the microscope according to the second embodiment or the microscope according to the third embodiment. FIG. 12 shows only an observation unit. The observation unit uses the magnifier optical systems in the third embodiment. Therefore, the structure of the magnifier optical systems is not shown in this drawing.

The observation unit 500 in this embodiment includes a main body part 501 and a display device 502. The main body part 501 is provided with magnifier optical systems 86a and 86b. The display device 502 is attachable/detachable to/from the main body mart 501. For this purpose, the main body part 501 has a mount portion (groove) 503 onto which the display device 502 is to be mounted. A portable information terminal may be used as the display device 502. This extends applications of information terminals.

As with the observation unit 20 in the first embodiment, the observation unit 500 in this embodiment has a display device and magnifier optical systems, and the observer observes an image displayed on the display device through the magnifier optical systems. Therefore, the microscope system of this embodiment also enjoys operational effects same as the microscope of the first embodiment. It is preferred that the observation unit in the fourth embodiment also satisfies conditional expression (6).

The observation unit of this embodiment includes the display device on which a certain input image is displayed and the magnifier optical systems arranged at a certain distance from the display device, the certain image is an image acquired by picking up an image formed through a microscope objective lens, and the observation unit satisfies either the following conditional expression (1A) or the following conditional expression (1B), and the following conditional expression (2):

$$0.9 \times \beta_{oc} < (L_d/L_i) \times (250/f_l) < 1.1 \times \beta_{oc} \quad (1A),$$

$$0.9 \times \beta_{oc} < q \times (L_d/L_i) \times (250/f_l) < 1.1 \times \beta_{oc} \quad (1B), \text{ and}$$

$$20° < \tan^{-1}(L_d/(2 \times f_l)) < 35° \quad (2)$$

where $\beta_{oc}$ is the magnification of an eyepiece in observation of an optical image, q is the magnification of the intermediate imaging lens, $L_d$ is the diagonal length of the display area of the display device, $L_i$ is the diagonal length of the image pickup area of the image pickup element, and $f_l$ is the focal length of the magnifier optical system.

According to this embodiment, there can be provided an observation unit that has excellent optical performance, can keep the observation magnification constant, and enables the observer to continue observation with concentration for a long time. Moreover, there can be provided an observation unit equipped with a shift mechanism and an adjusting mechanism that can be made simple in structure.

In the following, first to fourth examples of the magnifier optical system will be described. FIGS. 13A, 14A, 15A, and 16A are cross sectional views showing the optical configuration of the first to fourth examples of the magnifier optical system. In these cross sectional views, lenses L1 to L6 and an eye point EP are illustrated. The left side of the drawings is the object side, and the right side is the image side.

The magnifier optical system according to the first example is composed of a plano-convex positive lens L1, a biconcave negative lens L2, a biconvex positive lens L3, a biconvex positive lens L4, and a plano-convex positive lens L5. The biconcave negative lens L2 and the biconvex positive lens L3 are cemented together.

The magnifier optical system according to the second example is composed of a positive meniscus lens L1 having a convex surface directed toward the image side, a negative meniscus lens L2 having a convex surface directed toward the image side, a biconvex positive lens L3, a positive meniscus lens L4 having a convex surface directed toward the object side, a plano-convex positive lens L5, and a plano-concave negative lens L6. The positive meniscus lens L1 and the negative meniscus lens L2 are cemented together. The plano-convex positive lens L5 and the plano-concave negative lens L6 are cemented together.

The magnifier optical system according to the third example is composed of a biconvex positive lens L1 and a negative meniscus lens L2 having a convex surface directed toward the image side. The biconvex positive lens L1 and the negative meniscus lens L2 are cemented together.

The magnifier optical system according to the fourth example is composed of a positive meniscus lens L1 having a convex surface directed toward the object side and a negative meniscus lens L2 having a convex surface directed toward the object side. The positive meniscus lens L1 and the negative meniscus lens L2 are cemented together.

Numerical data of the optical components constituting each of the above described examples of the magnifier optical system will be given in the following. In the numerical data of the examples, r1, r2, . . . are curvature radii of the respective lens surfaces, d1, d2, . . . are the thicknesses of the respective lenses or air gaps, nd1, nd2, . . . are refractive indices of the respective lenses for the d-line, vd1, vd2, . . . are the Abbe constants of the respective lenses, f is the focal length, NA' is the numerical aperture, and EPL is the distance from the last lens surface to the eye point.

A display device is disposed on the object plane. The image height refers to the height of an image formed by the magnifier optical system and an ideal lens. The ideal lens is provided on the image side (eye point side) of the magnifier optical system and has a focal length of 25 mm. NA' is the numerical aperture on the image side in the case where the ideal lens is provided.

Example 1

Unit mm

Surface data

| Surface no. | r | d | nd | vd |
|---|---|---|---|---|
| Object plane | ∞ | 8.45 | | |
| 1 | ∞ | 4.80 | 1.7859 | 44.2 |
| 2 | −31.253 | 4.94 | | |
| 3 | −21.275 | 2.81 | 1.8052 | 25.4 |
| 4 | 39.37 | 7.40 | 1.6516 | 58.6 |
| 5 | −39.37 | 0.18 | | |
| 6 | 100.551 | 4.50 | 1.7440 | 44.8 |
| 7 | −59.027 | 0.18 | | |
| 8 | 29.478 | 5.40 | 1.5688 | 56.4 |
| 9 | ∞ | | | |

Various Data

| | |
|---|---|
| f | 25 |
| NA' | 0.12 |
| Image height | 11.4 |
| Half pupil diameter | 3 |
| EPL | 21 |

Example 2

| | Unit mm | | | |
|---|---|---|---|---|
| | Surface data | | | |
| Surface no. | r | d | nd | vd |
| Object plane | ∞ | 9.13 | | |
| 1 | −53.774 | 27.91 | 1.5750 | 41.5 |
| 2 | −30.872 | 4.50 | 1.6433 | 48.0 |
| 3 | −56.704 | 0.19 | | |
| 4 | 141.445 | 10.81 | 1.6138 | 56.4 |
| 5 | −117.503 | 0.19 | | |
| 6 | 54.814 | 9.89 | 1.6138 | 56.4 |
| 7 | 688.631 | 0.19 | | |
| 8 | 28.793 | 11.25 | 1.6138 | 56.4 |
| 9 | ∞ | 1.35 | 1.698951 | 30.1 |
| 10 | 31.975 | | | |

| Various Data | |
|---|---|
| f | 31.5 |
| NA' | 0.16 |
| Image height | 16.7 |
| Half pupil diameter | 4 |
| EPL | 20 |

Example 3

| | Unit mm | | | |
|---|---|---|---|---|
| | Surface data | | | |
| Surface no. | r | d | nd | vd |
| Object plane | ∞ | 117.8 | | |
| 1 | 72.200 | 13.7 | 1.5163 | 64.1 |
| 2 | −53.9 | 4.0 | 1.6477 | 33.8 |
| 3 | −173.889 | | | |

| Various Data | |
|---|---|
| f | 120.3 |
| NA' | 0.2 |
| Image height | 12.7 |
| Half pupil diameter | 5 |
| EPL | 30 |

Example 4

| | Unit mm | | | |
|---|---|---|---|---|
| | Surface data | | | |
| Surface no. | r | d | nd | vd |
| Object plane | ∞ | 117.8 | | |
| 1 | 41.732 | 12.0 | 1.5952 | 67.7 |
| 2 | 189.230 | 4.0 | 1.7205 | 34.7 |
| 3 | 56.966 | | | |

| Various Data | |
|---|---|
| f | 250 |
| NA' | 0.2 |
| Image height | 12.1 |
| Half pupil diameter | 5 |
| EPL | 30 |

FIGS. 13B to 13D, FIGS. 14B to 14D, FIGS. 15B to 15D, and 16B to 16D are aberration diagrams of the magnifier optical systems of the first to fourth examples. In the aberration diagrams, "FIY" is the image height. FIGS. 13B, 14B, 15B, and 16B show spherical aberration (SA), FIGS. 13C, 14C, 15C, and 16C show astigmatism (AS), and FIGS. 13D, 14D, 15D, and 16D show distortion (DT). These diagrams show aberrations in the case where images are formed by the magnifier optical system and the ideal lens.

Next, values of conditional expressions (1B) and (2) in each examples are described below.

Conditional Expression

| | Example 1 | Example 2 | Example 3 | Example 4 |
|---|---|---|---|---|
| (1B): $q(L_d/L_i)$ $(250/f_I)$ | 10 | 11.31 | 10.50 | 10.1 |
| (2): $\tan^{-1}(L_d/2f_I)$ | 24.5 | 33.7 | 25.5 | 24.7 |

Term values in each examples are described below.

| Term value | Example 1 | Example 2 | Example 3 | Example 4 |
|---|---|---|---|---|
| $\beta_{oc}$ | 10 | 10 | 10 | 10 |
| q | 0.5 | 0.35 | 0.5 | 0.5 |
| $L_d$ | 22.8 | 42 | 115 | 230 |
| $L_i$ | 11.4 | 13 | 11.4 | 11.4 |
| $f_I$ | 25 | 31.5 | 120.3 | 250 |

It is to be understood that various modifications can be made without departing from the essence of the present invention.

As described above, the present invention can suitably be applied to a microscope system that has excellent optical performance, can keep the observation magnification constant, and enables the observer to continue observation with concentration for a long time. Moreover, the present invention can suitably be applied to a microscope system having a shift mechanism and an adjusting mechanism, which can be made simple in structure.

The present invention can provide a microscope system having high optical performance, capable of keeping the observation magnification constant, and allowing the observer to continue observation with concentration for a long time. The present invention can also provide a microscope system equipped with a shift mechanism and/or an adjusting mechanism which can be made simple in structure.

What is claimed is:

1. A microscope system comprising a microscope and an observation unit provided separately from the microscope, wherein the microscope comprises a microscope objective lens, an image pickup element disposed at a position at which an image is formed through the microscope objective lens, and a first control apparatus connected with the image pickup element, the observation unit comprises a second control apparatus, a display device connected with the second control apparatus, and a magnifier optical system arranged at a predetermined distance from the display device, the microscope system further comprises a communication apparatus for communication between the first control apparatus and the second control apparatus so that an image picked up by the image pickup element is displayed on the display device, wherein the microscope system satisfies:

$$0.9 \times \beta_{oc} < (L_d/L_i) \times (250/f_l) < 1.1 \times \beta_{oc}, \text{ and}$$

$$20° < \tan^{-1}(L_d/(2 \times f_l)) < 35°,$$

where $\beta_{oc}$ is the magnification of an eyepiece in observation of an optical image, $L_d$ is the diagonal length of an display area of the display device, $L_i$ is the diagonal length of an image pickup area of the image pickup element, and $f_l$ is the focal length of the magnifier optical system.

2. A microscope system according to claim 1, further comprising an intermediate imaging lens arranged between the microscope objective lens and the image pickup element, wherein the microscope system satisfies:

$$0.9 \times \beta_{oc} < (L_d/L_i) \times (250/f_l) < 1.1 \times \beta_{oc}, \text{ and}$$

where q is the magnification of the intermediate imaging lens.

3. A microscope system according to claim 1, wherein the microscope system satisfies:

$$8 \leq \beta_{oc} \leq 30.$$

4. A microscope system according to claim 1, wherein
the observation unit further has another display device other than said display device and another magnifier optical system other than said magnifier optical system,
the display device and the magnifier optical system are arranged in a first optical path, and the other display device and the other magnifier optical system are arranged in a second optical path, and
the magnifier optical system and the other magnifier optical system are arranged side by side.

5. A microscope system according to claim 1, wherein the microscope system satisfies:

$$12 \text{ mm} < f_l \leq 50 \text{ mm}.$$

6. A microscope system according to claim 1, wherein the observation unit includes a reflecting member, the reflecting member being arranged at a position at which it reflects light coming from the display device toward the magnifier optical system.

7. A microscope system according to claim 6, wherein the observation unit further has another display device other than said display device, another magnifier optical system other than said magnifier optical system, and another reflecting member other than said reflecting member, the other reflecting member being arranged at a position at which it reflects light coming from the display device toward the other magnifier optical system.

8. A microscope system according to claim 1, wherein the microscope system satisfies:

$$50 \text{ mm} < f_l < 150 \text{ mm}.$$

9. A microscope system according to claim 1, wherein the observation unit further has another magnifier optical system other than said magnifier optical system, the magnifier optical system and the other magnifier optical system being arranged side by side at positions at which they are opposed to the display device.

10. A microscope system according to claim 1, wherein the microscope system satisfies:

$$100 \text{ mm} < f_l < 300 \text{ mm}.$$

11. A microscope system according to claim 1, wherein the observation unit has a mount part to/from which the display device is attachable/detachable.

12. A microscope system according to claim 1, further comprising an adjusting mechanism used to change the distance between the magnifier optical system and the other magnifier optical system.

13. A microscope system according to claim 1, further comprising a shift mechanism used to shift the magnifier optical system along its optical axis.

14. A microscope system according to claim 1, further comprising an adjusting mechanism used to adjust the elevation angle of the observation unit.

15. A microscope system according to claim 1, further comprising a shift mechanism used to shift the observation unit in the horizontal or vertical direction.

16. A microscope system according to claim 1, wherein the microscope system has a plurality of observation units.

17. A microscope system according to claim 1, further comprising an image processing system, wherein the image picked up by the image pickup element is output to the observation unit through the image processing system.

18. An observation unit comprising:
a display device that displays a certain input image; and
a magnifier optical system arranged at a predetermined distance from the display device, wherein
the certain image is an image obtained by picking up an image formed through a microscope objective lens using an image pickup element, and
the observation unit satisfies:

$$0.9 \times \beta_{oc} < (L_d/L_i) \times (250/f_l) < 1.1 \times \beta_{oc}, \text{ and}$$

$$20° < \tan^{-1}(L_d/(2 \times f_l)) < 35°,$$

where $\beta_{oc}$ is the magnification of an eyepiece in observation of an optical image, $L_d$ is the diagonal length of a display area of the display device, $L_i$ is the diagonal length of an image pickup area of the image pickup element, and $f_l$ is the focal length of the magnifier optical system.

19. An observation unit comprising:
a display device that displays a certain input image; and
a magnifier optical system arranged at a predetermined distance from the display device, wherein
the certain image is an image obtained by picking up an image formed through a microscope objective lens and an intermediate imaging lens, using an image pickup element, and
the observation unit satisfies:

$$0.9 \times \beta_{oc} < (L_d/L_i) \times (250/f_l) < 1.1 \times \beta_{oc}, \text{ and}$$

$$20° < \tan^{-1}(L_d/(2 \times f_l)) < 35°,$$

where $\beta_{oc}$ is the magnification of an eyepiece in observation of an optical image, q is the magnification of the intermediate imaging lens, $L_d$ is the diagonal length of a display area of the display device, $L_i$ is the diagonal length of an image pickup area of the image pickup element, and $f_l$ is the focal length of the magnifier optical system.

* * * * *